(12) United States Patent
Leondires et al.

(10) Patent No.: US 12,186,670 B2
(45) Date of Patent: *Jan. 7, 2025

(54) AUTOMATIC GENERATION OF NON-FUNGIBLE TOKEN ATTRIBUTES

(71) Applicant: DK Crown Holdings Inc., Boston, MA (US)

(72) Inventors: Peter Arthur Leondires, Boston, MA (US); Andrew John Botelho, Norton, MA (US); Kenneth Scott Bacon, Lakeville, MA (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/398,440

(22) Filed: Dec. 28, 2023

(65) Prior Publication Data

US 2024/0216820 A1 Jul. 4, 2024

Related U.S. Application Data

(63) Continuation of application No. 18/148,075, filed on Dec. 29, 2022, now Pat. No. 11,865,459.

(51) Int. Cl.
*A63F 13/792* (2014.01)
*A63F 13/828* (2014.01)
(Continued)

(52) U.S. Cl.
CPC .......... *A63F 13/792* (2014.09); *A63F 13/828* (2014.09); *H04L 9/3213* (2013.01); *H04L 9/50* (2022.05)

(58) Field of Classification Search
CPC ........ A63F 13/792; A63F 13/828; H04L 9/50; H04L 9/3213
See application file for complete search history.

(56) References Cited

U.S. PATENT DOCUMENTS 10,134,235 B2 * 11/2018 Litman ................ A63F 3/00157
10,751,628 B2 * 8/2020 Packin .................. H04L 9/3239
(Continued)

OTHER PUBLICATIONS

Non-Final Office Action on U.S. Appl. No. 18/148,075 dated Jun. 1, 2023.
(Continued)

*Primary Examiner* — William H McCulloch, Jr.
*Assistant Examiner* — Ankit B Doshi
(74) *Attorney, Agent, or Firm* — Foley & Lardner LLP

(57) ABSTRACT

Systems and methods for maintaining contests including non-fungible tokens (NFTs), determining that an outcome of a contest indicates a tie, and establishing a placeholder are disclosed. The NFTs can be associated with attributes and stored on a blockchain. The system can receive a request and selections of NFTs for entering a contest. Each NFT can be associated with a player profile and satisfy a selection rule. The system can generate a fantasy sports lineup including NFTs and modifying a restriction condition for each NFT. The system can determine that an outcome of a contest indicates a tie and calculating edition number totals to determine a winner of the tie. The system can determine that an NFT has been transferred to a player profile. The system can modify a first lineup to include a placeholder in lieu of an NFT.

20 Claims, 17 Drawing Sheets

(51) Int. Cl.
*H04L 9/00* (2022.01)
*H04L 9/32* (2006.01)

(56) References Cited

U.S. PATENT DOCUMENTS

| | | | |
|---|---|---|---|
| 11,883,749 B1* | 1/2024 | Leondires | H04L 9/3213 |
| 12,033,144 B2* | 7/2024 | Mo | H04L 9/3247 |
| 2019/0035208 A1* | 1/2019 | Simons | G07F 17/3295 |
| 2019/0035209 A1* | 1/2019 | Simons | G07F 17/32 |
| 2020/0376387 A1* | 12/2020 | Packin | H04L 9/0637 |
| 2020/0388108 A1* | 12/2020 | Simons | G07F 17/3295 |
| 2022/0230506 A1* | 7/2022 | Simons | G07F 17/3272 |
| 2022/0253811 A1* | 8/2022 | Fowler | G06K 7/10297 |
| 2022/0401842 A1* | 12/2022 | Farudi | A63F 13/847 |
| 2023/0035314 A1* | 2/2023 | Fowler | G06K 7/10366 |
| 2023/0057809 A1* | 2/2023 | Naughton, II | A63F 13/65 |
| 2023/0101707 A1* | 3/2023 | Smith | A63F 13/69 463/42 |
| 2023/0119641 A1* | 4/2023 | Meyers | A63F 13/69 463/42 |

OTHER PUBLICATIONS

Notice of Allowance on U.S. Appl. No. 18/148,075 dated Sep. 19, 2023.

* cited by examiner

FIG. 6G

AUTOMATIC GENERATION OF NON-FUNGIBLE TOKEN ATTRIBUTES

CROSS-REFERENCE TO RELATED APPLICATIONS

This application is a continuation of and claims priority to U.S. patent application Ser. No. 18/148,075, filed Dec. 29, 2022, the contents of which are incorporated herein by reference in its entirety for all purposes.

BACKGROUND

Content management systems allocate and utilize large amounts of computing resources to communicate and process data from a large number of remote computing devices. When serving a large number of mobile devices, memory and processing power are finite resources. Therefore, it is challenging to appropriately distribute and process information from a large number of devices.

SUMMARY

The present disclosure relates to one or more systems and methods for contests implemented with non-fungible tokens (NFTs). The data processing system described herein can maintain contests which include a plurality of NFTs, determine a winner of a tie of an NFT-based contest, and implement a placeholder for a contest in which an NFT has been transferred. The systems and methods can generate a lineup of NFTs for use in contests. Contests implemented with NFTs further face difficulties when it comes to awarding NFTs and managing NFTs in a lineup. The systems and methods further provide techniques for determining the winner of a contest given a tie. Existing technical solutions that execute contests determine ties by splitting a prize pool, which is incompatible with prizes that include indivisible awards, such as NFTs. Additionally, accessing data associated with NFTs stored on a blockchain can often be computationally heavy and cause latency issues for the player, particularly when executing contests in real-time or near real-time.

The systems and methods of this technical solution solves these and other issues by implementing contests based on individual properties of NFTs, by implementing a tie breaking system for contests with indivisible awards, and by implementing a placeholder system for contests involving NFTs as entrants and as awards of the contest. The systems and methods described herein can break ties of contests as well as institute a placeholder for flagged NFTs. Furthermore, a placeholder can be implemented within a contest to enable a player the flexibility of managing an NFT while still being able to participate in a contest. Furthermore, the systems and methods described herein can store attributes associated with an NFT in a local storage at the start of the contest to enable faster processing than continuously accessing these attributes on the blockchain.

At least one aspect relates to a method. The method can include maintaining, by one or more processors coupled to memory, a plurality of contests. Each contest of the plurality of contests can define a respective plurality of slots for entrants of the contest. Each slot of the respective plurality of slots of the contest can include a respective selection rule. The method can include maintaining, by one or more processors coupled to memory, a plurality of non-fungible tokens. Each non-fungible token of the plurality of non-fungible tokens can include a respective rarity value and a respective participant identifier. The method can include receiving, by one or more processors coupled to memory, from a client device associated with a player profile, a request to enter a first contest of the plurality of contests. The method can include receiving, by the one or more processors, from the client device, selections of a set of non-fungible tokens. Each non-fungible token of the set can be associated with the player profile and can correspond to a respective slot of the respective plurality of slots of the first contest. Each non-fungible token can satisfy the selection rule of the respective slot. The method can include generating a fantasy sports lineup responsive to determining that the respective selection rule for each slot of the respective plurality of slots of the first contest is satisfied. The fantasy sports lineup can include each non-fungible token of the second subset of the plurality of non-fungible tokens for the first contest. The method can include modifying, by the one or more processors, a restriction condition for each non-fungible token of the set to restrict each non-fungible token of the set from entry into a second contest.

In some embodiments, the method can include maintaining the plurality of non-fungible tokens on a blockchain. In some embodiments, the method can include the respective rarity value of each non-fungible token of the plurality of tokens maintained on the blockchain. In some embodiments, the method can further include determining that each non-fungible token of the set of non-fungible tokens is associated with the player profile by accessing a private key in the player profile.

In some embodiments, the method can include each contest of the plurality of contests includes a contest selection rule. In some embodiments, the method can include generating the fantasy sports lineup. In some embodiments, generating the fantasy sports lineup can include transmitting a content item to the client device indicating each non-fungible token of the set included in the fantasy sports lineup. In some embodiments, each non-fungible token of the plurality of non-fungible tokens can be associated with a respective position value. In some embodiments, determining that the selection rule for each slot of the first contest is satisfied can be further based on the respective position value satisfying a respective position requirement of the slot.

In some embodiments, the method can further include providing instructions to present a user interface that can include one or more indicators of a subset of the plurality of contests. In some embodiments the method can further include providing, responsive to the request to enter the first contest, a user interface including a set of content items. In some embodiments, each content item of the set of content items can correspond to a respective non-fungible token of the set of non-fungible tokens. In some embodiments, the method can further include updating, by the one or more processors, a counter value in the player profile based on the fantasy sports lineup and an outcome of the contest.

At least one aspect relates to a system. The system can include one or more processors coupled to memory. The one or more processors can be configured to maintain a plurality of contests. Each contest of the plurality of contests can define a respective plurality of slots for entrants of the contest. Each slot of the respective plurality of slots of the contest can include a respective selection rule. The one or more processors can be configured to maintain a plurality of non-fungible tokens. Each non-fungible token of the plurality of non-fungible tokens can include a respective rarity value and a respective participant identifier. The one or more processors can be configured to receive, from a client device associated with a player profile, a request to enter a first contest of the plurality of contests. The one or more processors can be configured to receive, from the client device, selections of a set of non-fungible tokens. Each non-fungible token of the set can be associated with the player profile and can correspond to a respective slot of the respective plurality of slots of the first contest. Each non-fungible token can satisfy the selection rule of the respective slot. The one or more processors can be configured to generate a fantasy sports lineup responsive to determining that the respective selection rule for each slot of the respective plurality of slots of the first contest is satisfied. The fantasy sports lineup can include each non-fungible token of the second subset of the plurality of non-fungible tokens for the first contest. The one or more processor can be configured to modify a restriction condition for each non-fungible token of the set to restrict each non-fungible token of the set from entry into a second contest.

In some embodiments, the system can include the plurality of non-fungible tokens maintained on a blockchain. In some embodiments, the system can include the respective rarity value of each non-fungible token of the plurality of tokens maintained on the blockchain. In some embodiments, the system can include the one or more processors, further configured to determine that each non-fungible token of the set of non-fungible tokens is associated with the player profile by accessing a private key in the player profile.

In some embodiments, the system can include each contest of the plurality of contests including a contest selection rule. In some embodiments, the system can include generating the fantasy sports lineup by performing operations including transmitting a content item to the client device. The content item can indicate that each non-fungible token of the set included in the fantasy sports lineup. In some embodiments, the system can include each non-fungible token of the plurality of non-fungible tokens associated with a respective position value. In some embodiments, the system can include determining that the selection rule for each slot of the first contest is satisfied further based on the respective position value satisfying a respective position requirement of the slot.

In some embodiments, the system can include providing, to the client device, instructions to present a user interface that can include one or more indicators of a subset of the plurality of contests. In some embodiments, the system can include, responsive to the request to enter the first contest, a user interface. The user interface and include a set of content items, each content item of the set of content corresponding to a respective non-fungible token of the set of non-fungible tokens. In some embodiments, the system can include the one or more processors further configured to update a counter value in the player profile based on the fantasy sports lineup and an outcome of the contest.

At least one aspect can relate to a method. The method can include maintaining, by one or more processors coupled to memory, a plurality of non-fungible tokens. Each non-fungible token of the plurality of non-fungible tokens can be stored on a blockchain and associated with a respective edition number. The method can include determining, by the one or more processors, that an outcome of a contest indicates a tie. The contest can include a first lineup having a first subset of the plurality of non-fungible tokens and a second lineup having a second subset of the plurality of non-fungible tokens. The method can include calculating, by the one or more processors, based on the respective edition number of each non-fungible token of the first lineup and the respective edition number of each non-fungible token of the second lineup, a first edition number total of the first lineup and a second edition number total of the second lineup, responsive to determining that the outcome of the contest indicates the tie. The method can include selecting, by the one or more processors, one of the first lineup or the second lineup based on the first edition number total and the second edition number total.

In some embodiments, the method can include determining that the outcome of the contest indicating the tie is responsive to determining, by the one or more processors, that an award of the contest includes an award non-fungible token. In some embodiments, the method can further include accessing, by the one or more processors, the respective edition number of each non-fungible token of the first subset and the respective edition number of each non-fungible token of the second subset from a local storage that is separate from the blockchain. In some embodiments, the method can further include storing, by the one or more processors, the respective edition number of each non-fungible token of the first subset and the respective edition number of each non-fungible token of the second subset in association with the contest at a contest start time.

In some embodiments, determining the outcome of the contest indicates a tie can include determining, by the one or more processors, a first value of points associated with the first lineup is equal to a second value of points associated with the second lineup. In some embodiments, calculating the first edition number total of the first lineup can include summing, by the one or more processors, the respective edition number of each non-fungible token of the first subset. In some embodiments, selecting the one of the first lineup or the second lineup can include determining, by the one or more processors, that the first edition number total is greater than the second edition number total.

At least one aspect can relate to a method. The method can include maintaining, by the one or more processors, a plurality of non-fungible tokens in a blockchain. The method can include maintaining, by one or more processors coupled to memory, a plurality of active contests. Each contest of the plurality of active contests can have an entrant lineup including a respective subset of the plurality of non-fungible tokens. The subset can be associated with a respective player profile. The method can include determining, by the one or more processors, based on the blockchain, that a first non-fungible token of a first lineup of a first contest of the plurality of active contests has been transferred to a second player profile. The first lineup can be associated with a first player profile. The method can include modifying, by the one or more processors, the first lineup to include a placeholder in lieu of the first non-fungible token, responsive to determining that the first non-fungible token has been transferred to the second player profile. The method can include executing, by the one or more processors, the first contest based on the modified first lineup including the placeholder.

In some embodiments, the method can further include determining, by the one or more processors, prior to a start time of the first contest, that a second non-fungible token of the first lineup is associated with a listing flag. In some embodiments, the method can include generating, by the one or more processors, prior to a start time of the first contest, a notification for transmission to a client device associated with the first player profile indicating that the second non-fungible token is associated with the listing flag. In some embodiments, the method can include executing the first contest based on the modified first lineup. In some embodiments, executing the first contest based on the modified first lineup can include accumulating, by the one or more processors, at least one point for the first lineup based on the first lineup not including the first non-fungible token.

In some embodiments, the method can include determining, by the one or more processors, that the first non-fungible token of the first lineup has been transferred to a second player profile. In some embodiments, the determination can include accessing, by the one or more processors, a private key associated with the first player profile. In some embodiments, the method can further include restricting, by the one or more processors, a second non-fungible token of the first lineup from being associated with a listing flag responsive to executing the first contest. In some embodiments, the method can further include providing, by the one or more processors, instructions to display a notification at a client device associated with the first player profile indicating that the second non-fungible token is restricted.

At least one aspect relates to a system. The system can include one or more processors coupled to memory. The one or more processors can be configured to maintain a plurality of non-fungible tokens. Each non-fungible token of the plurality of non-fungible tokens can be stored on a blockchain and can be associated with a respective edition number. The system can be configured to determine that an outcome of a contest indicates a tie. The contest can include a first lineup having a first subset of the plurality of non-fungible tokens and a second lineup having a second subset of the plurality of non-fungible tokens. Responsive to determining that the outcome of the contest indicates the tie, the system can be configured to calculate, based on the respective edition number of each non-fungible token of the first lineup and the respective edition number of each non-fungible token of the second lineup, a first edition number total of the first lineup and a second edition number total of the second lineup. The system can be configured to select one of the first lineup or the second lineup based on the first edition number total and the second edition number total.

In some embodiments, the one or more processors can be further configured to determine that the outcome of the contest indicates the tie, responsive to determining that an award of the contest includes an award non-fungible token. In some embodiments, the system can include the one or more processors, further configured to access the respective edition number of each non-fungible token of the first subset and the respective edition number of each non-fungible token of the second subset from a local storage that is separate from the blockchain. In some embodiments, the system can include the one or more processors, further configured to store the respective edition number of each non-fungible token of the first subset and the respective edition number of each non-fungible token of the second subset in association with the contest at a contest start time.

In some embodiments, the system can include the one or more processors, further configured to determine the outcome of the contest indicates a tie. In some embodiments, the determination includes performing operations. The operations can include determining a first value of points associated with the first lineup is equal to a second value of points associated with the second lineup. In some embodiments, the system can include the one or more processors, further configured to calculate the first edition number total of the first lineup. In some embodiments, the calculation can include performing operation. The operations can include summing the respective edition number of each non-fungible token of the first subset. In some embodiments, the system can include the one or more processors, further configured to select the one of the first lineup or the second lineup by performing operations. The operations can include determining that the first edition number total is greater than the second edition number total.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular forms of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIGS. 6A, 6B, 6C, 6D, 6E, 6F, 6G, and 6H illustrate example user interfaces associated with the techniques described herein as generated by the systems of FIG. 2 and FIG. 4, in accordance with one or more implementations.

DETAILED DESCRIPTION

Below are detailed descriptions of various concepts related to, and implementations of, techniques, approaches, methods, apparatuses, and systems for using NFTs in contests. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful:

Section A describes a network environment and computing environment which may be useful for practicing embodiments described herein; and Section B describes systems and methods for generating a lineup of NFTs for use in contests.

Section C describes systems and methods for determining the winner of a tie of a contest based on edition numbers and establishing a placeholder upon NFT transfer.

A. Computing and Network Environment

Figure 1A:
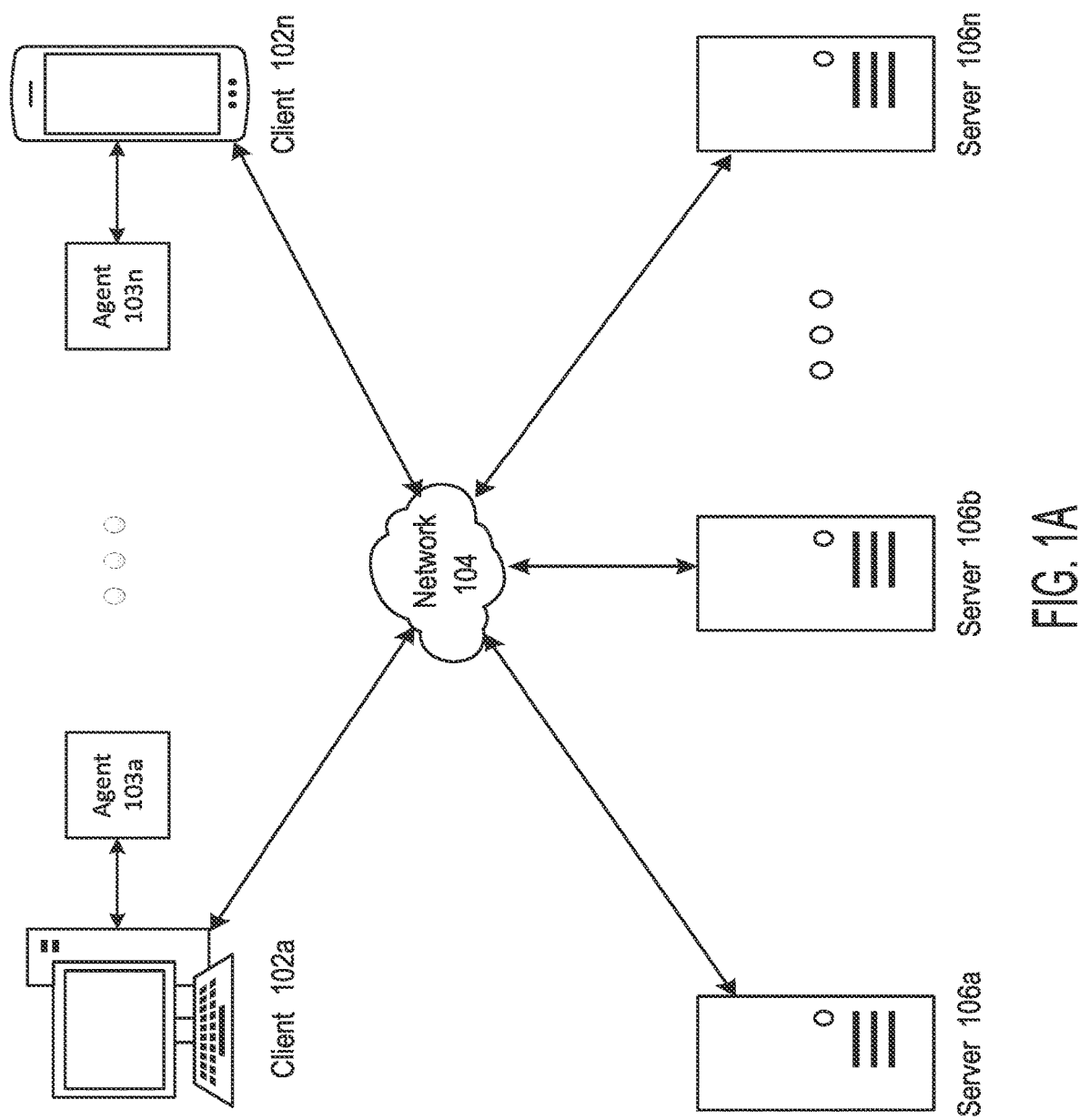
FIG. 1A is a block diagram depicting an embodiment of a network environment comprising a client device in communication with a server device.

Prior to discussing specific implements of the various aspects of this technical solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103a-103n and one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel, or satellite band. The wireless links may also include any cellular network standards used to communicate among mobile devices, including standards that qualify as 1G, 2G, 3G, 4G, or 5G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local area network (LAN) (e.g., Intranet), a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include an application layer, transport layer, internet layer (including, e.g., IPv6), or link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous-one or more of the servers 106 or remote machines 106 can operate according to one type of operating system platform (e.g., WINDOWS NT, manufactured by Microsoft Corp. of Redmond, Washington), while one or more of the other servers 106 can operate according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks 104. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide area network (WAN) connection or a metropolitan area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft, or others. Hosted hypervisors may run within an operating system on a second software level. Examples of hosted hypervisors may include VMware Workstation and VIRTUALBOX.

Management of the machine farm 38 may be decentralized. For example, one or more servers 106 may comprise components, subsystems, and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 106 may be in the path between any two communicating servers.

Figure 1B:
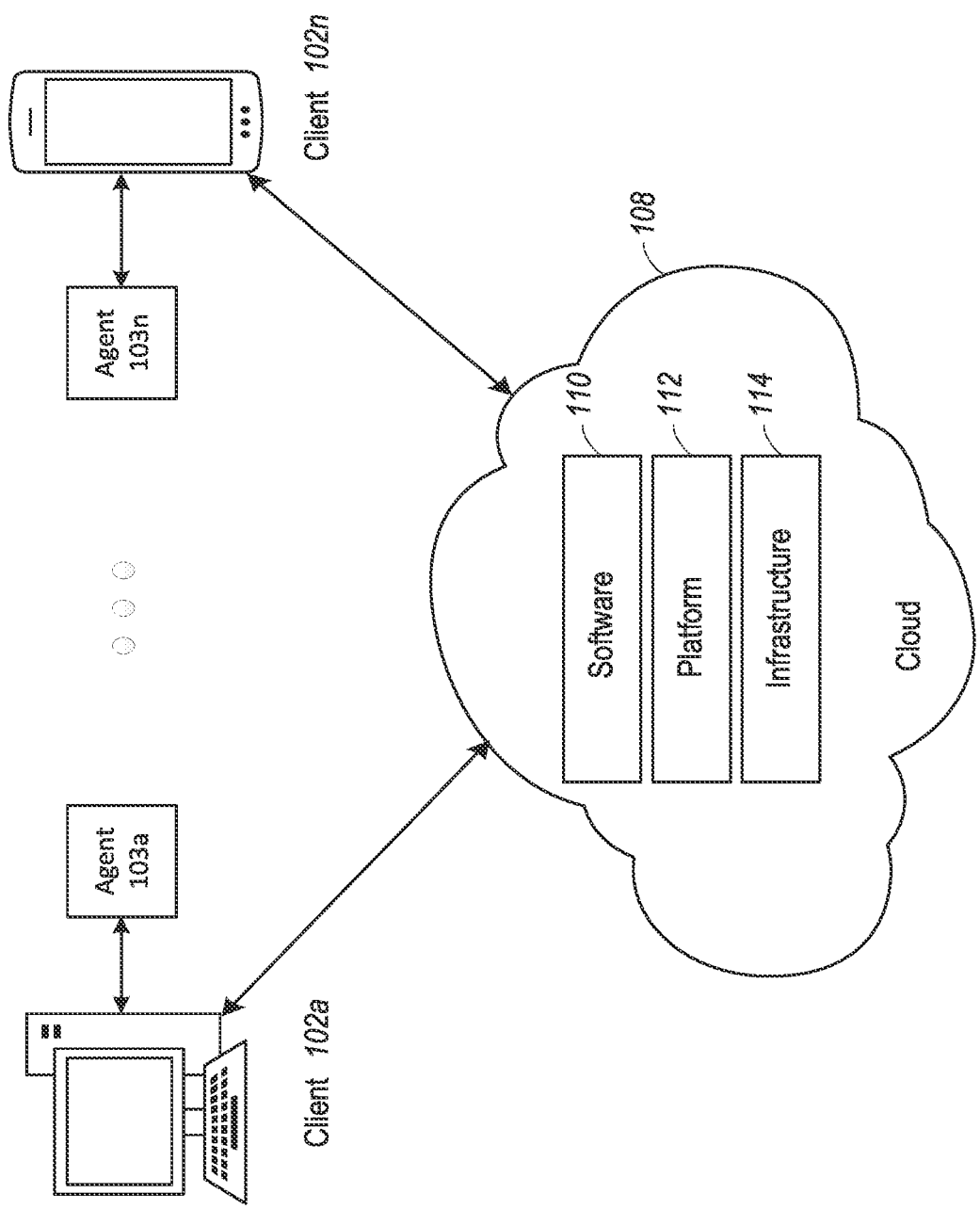
FIG. 1B is a block diagram depicting a cloud computing environment comprising a client device in communication with cloud service providers.

Referring to FIG. 1B, a cloud computing environment is depicted. A cloud computing environment may provide client 102 with one or more resources provided by a network environment. The cloud computing environment may include one or more clients 102*a*-102*n*, in communication with respective agents 103*a*-103*n* and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms, or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds 108 may be connected to the servers 106 over a public network 104. Private clouds 108 may include private servers 106 that are physically maintained by clients 102 or owners of clients. Private clouds 108 may be connected to the servers 106 over a private network 104. Hybrid clouds 108 may include both the private and public networks 104 and servers 106.

The cloud 108 may also include a cloud based delivery, e.g., Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington; RACKSPACE CLOUD provided by Rackspace US, Inc., of San Antonio, Texas; Google Compute Engine provided by Google Inc. of Mountain View, California; or RIGHTSCALE provided by RightScale, Inc., of Santa Barbara, California. PaaS providers may offer functionality provided by IaaS, including, e.g., storage, networking, servers, or virtualization, as well as additional resources such as, e.g., the operating system, middleware, or runtime resources. Examples of PaaS include WINDOWS AZURE provided by Microsoft Corporation of Redmond, Washington; Google App Engine provided by Google Inc.; and HEROKU provided by Heroku, Inc., of San Francisco, California. SaaS providers may offer the resources that PaaS provides, including storage, networking, servers, virtualization, operating system, middleware, or runtime resources. In some embodiments, SaaS providers may offer additional resources, including, e.g., data and application resources. Examples of SaaS include GOOGLE APPS provided by Google Inc.; SALESFORCE provided by Salesforce.com Inc. of San Francisco, California; or OFFICE 365 provided by Microsoft Corporation. Examples of SaaS may also include data storage providers, e.g., DROPBOX provided by Dropbox, Inc., of San Francisco, California; Microsoft SKYDRIVE provided by Microsoft Corporation; Google Drive provided by Google Inc.; or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages, including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
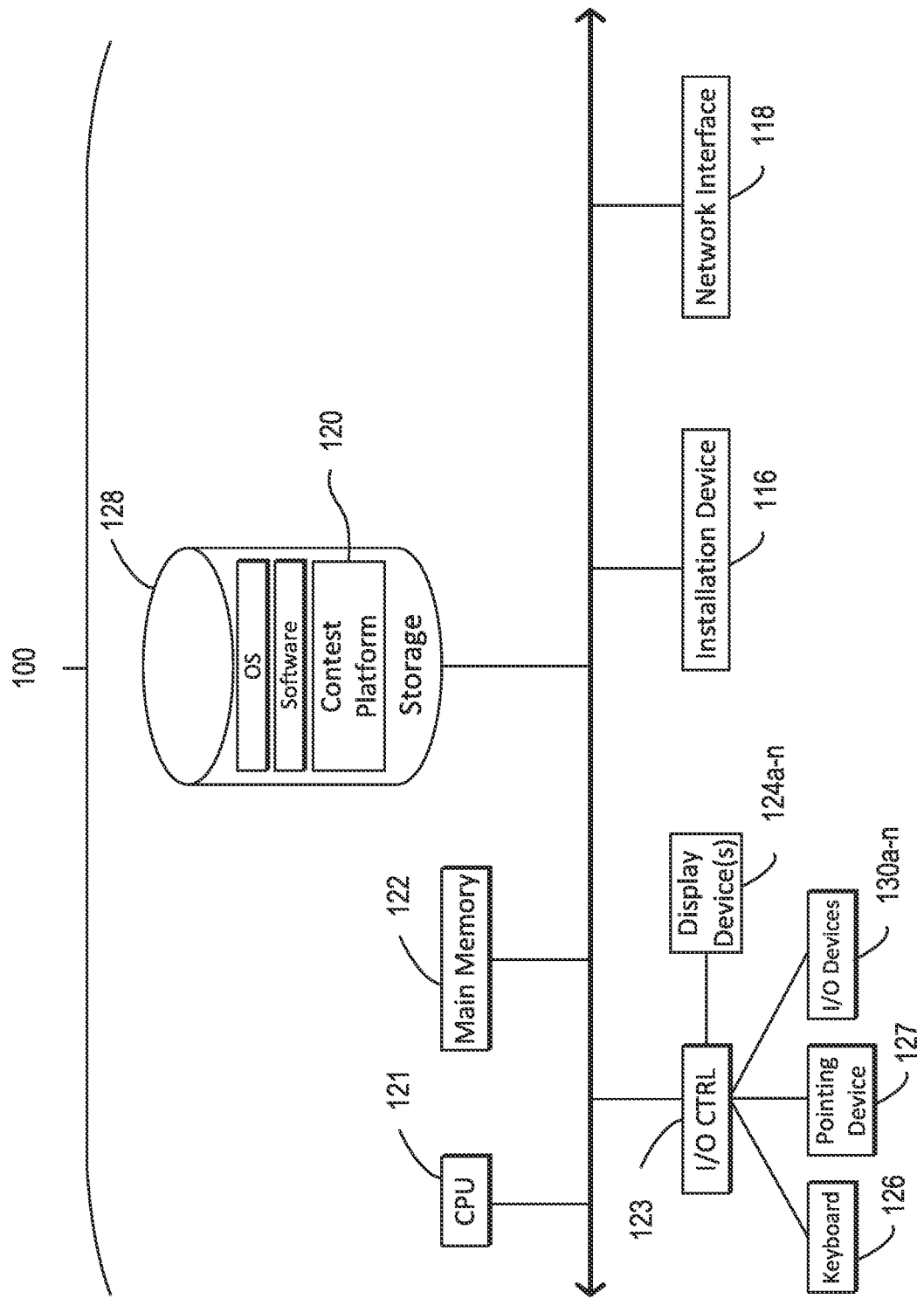
FIGS. 1C and 1D are block diagrams depicting embodiments of computing devices useful in connection with the methods and systems described herein.
Figure 1D:
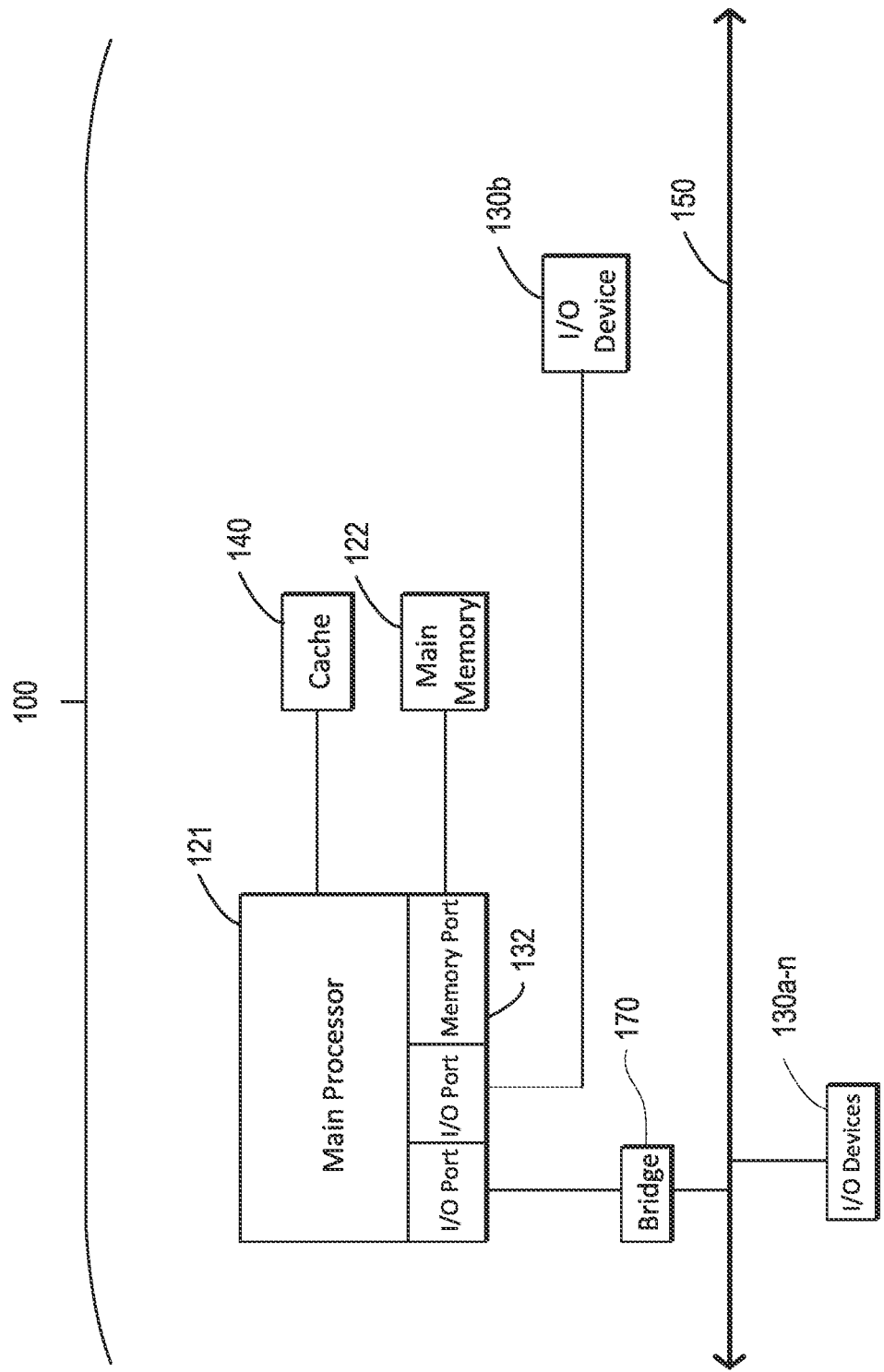

The client 102 and server 106 may be deployed as and/or executed on any type and form of computing device, e.g., a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121 and a main memory unit 122. As shown in FIG. 1C, a computing device 100 may include a storage device 128, an installation device 116, a network interface 118, an I/O controller 123, display devices 124a-124n, a keyboard 126, and a pointing device 127, e.g., a mouse. The storage device 128 may include, without limitation, an operating system, software, and contest platform 120, which can implement any of the features of the data processing system 205 and/or 405 described herein below in connection with FIG. 2 and FIG. 4, respectively. As shown in FIG. 1D, each computing device 100 may also include additional optional elements, e.g., a memory port 132, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g., those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the main processor 121. Main memory unit 122 may be volatile and faster than storage 128 memory. Main memory units 122 may be dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FcRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus 150 but communicates with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provide for facial recognition which may be utilized as an input for different purposes including authentication and other commands. Some devices 130a-130n provides for voice recognition and inputs, including, e.g., Microsoft KINECT, SIRI for IPHONE by Apple, Google Now, or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality, including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices 130a-130n may be controlled by an I/O controller 123 as shown in FIG. 1C. The I/O controller 123 may control one or more I/O devices 130a-130n, such as, e.g., a keyboard 126 and a pointing device 127, e.g., a mouse or optical pen. Furthermore, an I/O device 130 may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g., a USB bus, a SCSI bus, a Fire Wire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect, or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100 via the network 104. In some embodiments, software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g., one or more hard disk drives or redundant arrays of independent disks) for storing an operating system or other related software, and for storing application software programs such as any program related to the contest platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software 110 can be run from a bootable medium, for example, a bootable CD, e.g., KNOPPIX, a bootable CD for GNU/Linux that is available as a GNU/Linux distribution from knoppix.net.

Client device 100 may also install software 110 or application from an application distribution platform 112. Examples of application distribution platforms 112 include the App Store for iOS provided by Apple, Inc.; the Mac App Store provided by Apple, Inc.; GOOGLE PLAY for Android OS provided by Google Inc.; Chrome Webstore for CHROME OS provided by Google Inc.; and Amazon Appstore for Android OS and KINDLE FIRE provided by Amazon.com, Inc. An application distribution platform 112 may facilitate installation of software 110 on a client device 102. An application distribution platform 112 may include a repository of applications on a server 106 or a cloud 108, which the clients 102a-102n may access over a network 104. An application distribution platform 112 may include an application developed and provided by various developers. A user of a client device 102 may select, purchase, and/or download an application via the application distribution platform 112.

Furthermore, the computing device 100 may include a network interface 118 to interface to the network 104 through a variety of connections, including, but not limited to, standard telephone lines, LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol, e.g., Secure Socket Layer (SSL) or Transport Layer Security (TLS), or the Citrix Gateway Protocol manufactured by Citrix Systems, Inc., of Ft. Lauderdale, Florida. The network interface 118 may comprise a built-in network adapter, network interface card, PCMCIA network card, EXPRESSCARD network card, card bus network adapter, wireless network adapter, USB network adapter, modem, or any other device suitable for interfacing between the computing device 100 and any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc., of Cupertino, California; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, an XBOX ONE X, an XBOX SERIES S, or an XBOX SERIES X, manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats, including, but not limited to, MP3, WAV, M4A/ AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet, e.g., the IPAD line of devices by Apple; GALAXY TAB family of devices by Samsung; or KINDLE FIRE, by Amazon.com, Inc., of Seattle, Washington. In other embodiments, the computing device 100 is an eBook reader, e.g., the KINDLE family of devices by Amazon.com, or NOOK family of devices by Barnes & Noble, Inc., of New York City, New York.

In some embodiments, the communications device 102 includes a combination of devices, e.g., a smartphone combined with a digital audio player or portable media player. For example, one of these embodiments is a smartphone, e.g., the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g., a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Generating a Lineup of Non-Fungible Tokens (NFTs) for Use in Contests

The systems and methods of this technical solution provide techniques for generating a lineup of non-fungible tokens for use in contests. Existing technical solutions that address adding members to a contest do not evaluate properties of NFTs, such as rarity, when constructing contest lineups.

The systems and methods described herein implement NFTs to implement an improved scoring system and to improve processing efficiency and bandwidth utilization compared to existing systems. The systems and methods described herein can use NFTs to denote respective athletes, each of which can include individual NFT attributes. To score an individual athlete, the system can use scores from the team that the athlete belongs to, as opposed to individual statistics from each player. In some implementations, NFTs associated with particular positions can be more highly valued (e.g., according to weight values specified in rules of the respective contest). This weighting is advantageous for systems implementing NFTs as athletes because the non-fungible nature of an NFT-associated athlete allows an increased player experience by providing more viable athlete options when participating in contests. Attributes associated with each NFT can add additional considerations for selecting certain NFTs as entrants to contests. Furthermore, in some implementations, lineups generated based on NFTs can be scored in relation to the teams, positions, or attributes of the NFTs, as opposed to moves made or statistics of individual players.

Figure 2:
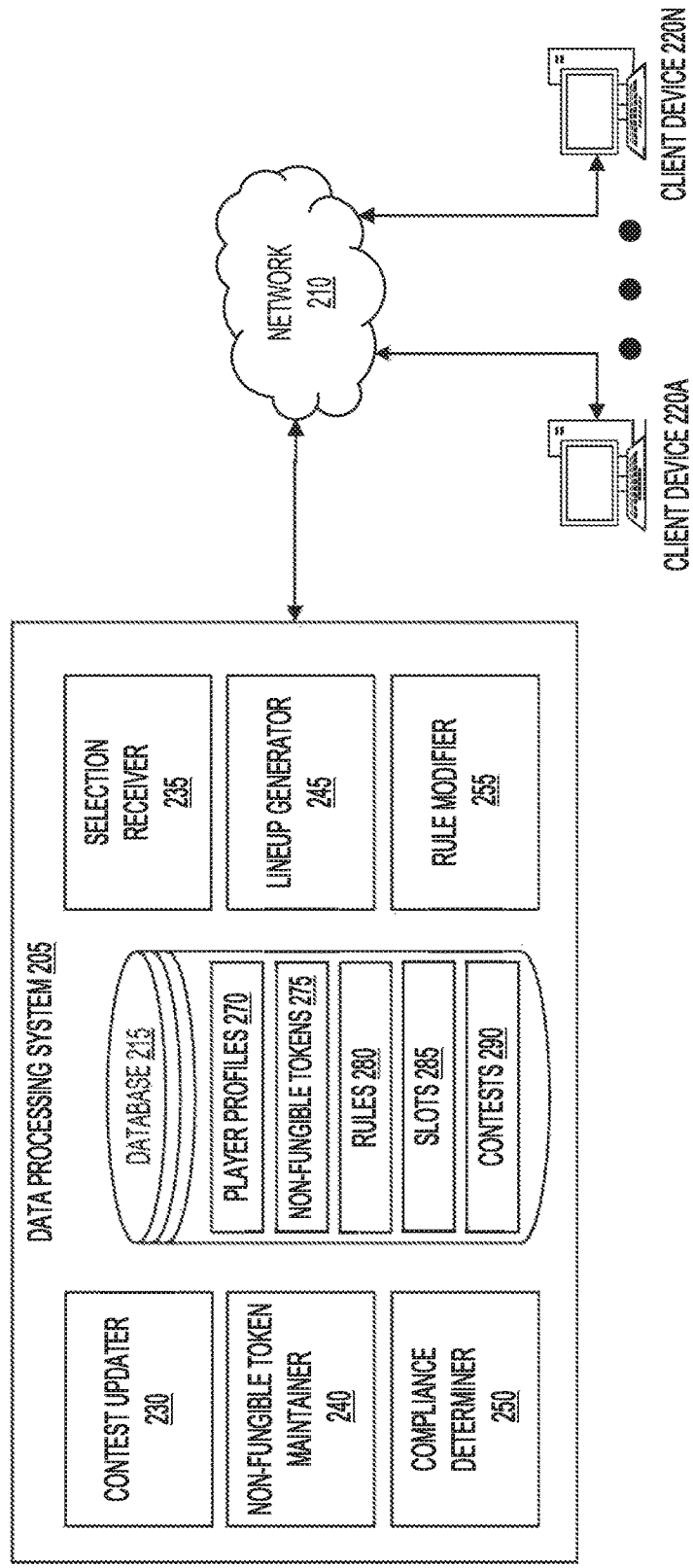
FIG. 2 is a block diagram of an example system for generating a lineup of NFTs for use in contests, in accordance with one or more implementations.

Referring now to FIG. 2, illustrated is a block diagram of an example system 200 for generating a lineup of non-fungible tokens (NFTs) for use in contests in accordance with one or more implementations. The system 200 can include at least one data processing system 205, at least one network 210, and one or more client devices 220A-220N (sometimes generally referred to as client device(s) 220). The data processing system 205 can include a contest updater 230, a selection receiver 235, a non-fungible token maintainer 240, a lineup generator 245, a compliance determiner 250, a rule modifier 255, and at least one database 215. The database 215 can include one or more player profiles 270, non-fungible tokens (NFTs) 275, rules 280, slots 285, and contests 290. Although shown here as internal to the data processing system 205, the database 215 can be external to the data processing system 205, for example, as a part of a cloud computing system or an external computing device in communication with the devices (e.g., the data processing system 205, the client devices 220, etc.) of the system 200 via the network 210.

Each of the components (e.g., the data processing system 205, the network 210, the client devices 220, the contest updater 230, the selection receiver 235, the non-fungible token maintainer 240, the lineup generator 245, the compliance determiner 250, the rule modifier 255, the database 215, etc.) of the system 200 can be implemented using the hardware components or a combination of software with the hardware components of a computing system, such as the computing system 100 detailed herein in conjunction with FIGS. 1A-1D, or any other computing system described herein. Each of the components of the data processing system 205 can perform the functionalities detailed herein.

The data processing system 205 can include at least one processor and a memory (e.g., a processing circuit). The memory can store processor-executable instructions that, when executed by a processor, cause the processor to perform one or more of the operations described herein. The processor may include a microprocessor, an application-specific integrated circuit (ASIC), a field-programmable gate array (FPGA), a graphics processing unit (GPU), a tensor processing unit (TPU), etc., or combinations thereof.

The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 205 can include one or more computing devices or servers that can perform various functions as described herein. The data processing system 205 can include any or all of the components and perform any or all of the functions of the computer system 100 described herein in conjunction with FIGS. 1A-1D.

In some implementations, the data processing system 205 may communicate with the client devices 220, for example, to provide user interfaces (e.g., the user interfaces described in connection with FIGS. 6A-6H, etc.) and to receive user input, via the network 210. In one example, the data processing system 205 can be or can include an application server or webserver, which may include software modules allowing various computing devices (e.g., the client devices 220, etc.) to access or manipulate data stored by the data processing system 205. For example, the data processing system 205 may include a webserver allowing the client devices 220 to access data (e.g., via one or more web-based user interfaces, such as those described in connection with FIGS. 6A-6H) that is collected and manipulated by the data processing system 205. For example, a player accessing the functionality of the data processing system 205 using a corresponding player profile 270 may execute a web browser application and access a website hosted on the webserver in order to access data (e.g., one or more interfaces to select combinations of NFTs 275 for one or more contests 290 as described herein, etc.).

The network 210 can include computer networks such as the Internet, local, wide, metro or other area networks, intranets, satellite networks, other computer networks such as voice or data mobile phone communication networks, or combinations thereof. The data processing system 205 of the system 200 can communicate via the network 210 with one or more computing devices, such as the one or more client devices 220. The network 210 may be any form of computer network that can relay information between the data processing system 205, the one or more client devices 220, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks. The network 210 may also include any number of computing devices (e.g., computers, servers, routers, network switches, etc.) that are configured to receive or transmit data within the network 210.

The network 210 may further include any number of hardwired or wireless connections. Any or all of the computing devices described herein (e.g., the data processing system 205, the one or more client devices 220, the computer system 100, etc.) may communicate wirelessly (e.g., via Wi-Fi, cellular communication, radio, etc.) with a transceiver that is hardwired (e.g., via a fiber optic cable, a CAT5 cable, etc.) to other computing devices in the network 210. Any or all of the computing devices described herein (e.g., the data processing system 205, the one or more client devices 220, the computer system 100, etc.) may also communicate wirelessly with the computing devices of the network 210 via a proxy device (e.g., a router, network switch, or gateway). In some implementations, the network 210 can be similar to or can include the network 104 or the cloud 108 described herein above in conjunction with FIGS. 1A and 1B.

Each of the client devices 220 can include at least one processor and a memory (e.g., a processing circuit). The memory can store processor-executable instructions that, when executed by the processor, cause the processor to perform one or more of the operations described herein. The processor can include a microprocessor, an ASIC, an FPGA, a GPU, a TPU, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 220 can include one or more computing devices or servers that can perform various operations as described herein. The one or more client devices 220 can include any or all of the components and perform any or all of the functions of the computer system 100 described herein in conjunction with FIGS. 1A-1D. The client devices 220 can be, or can be similar to, the client devices 102 described herein above in connection with FIGS. 1A-1D.

Each client device 220 can be a personal computer, a laptop computer, a television device, a smart phone device, a mobile device, or another type of computing device. Each client device 220 can be implemented using hardware or a combination of software and hardware. Each client device 220 can include a display or display portion. The display can include a display portion of a television, a display portion of a computing device, a GUI, or another type of interactive display (e.g., a touchscreen, a display, etc.) and one or more I/O devices (e.g., a mouse, a keyboard, digital key pad). The display can present one or more user interfaces described in connection with FIGS. 6A-6H, which relate to the systems and methods described herein. The display can include a touch screen displaying an application, such as a web browser application or a native application, which may be used to access the functionality of the data processing system 205, as described herein.

The display may include a border region (e.g., side border, top border, bottom border). The display can include a touch screen display, which can receive interactions from a player. The client device 220 may also receive interactions via any other type of I/O device. The interactions can result in interaction data, which can be stored and transmitted by the processing circuitry of the client device 220. The interaction data can include, for example, interaction coordinates, an interaction type (e.g., drag, click, swipe, scroll, tap, etc.), and an indication of an actionable object (e.g., an interactive user interface element, such as a button, hyperlink, etc.) with which the interaction occurred. The interaction data can identify a user interface element (e.g., including any of the user interface elements described in connection with FIGS. 6A-6H) with which the interaction occurred.

Each client device 220 can include an input device that couples or communicates with the display of each client device 220 to enable a player to interact with or select one or more actionable objects as described herein. The display can enable interaction with one or more visual indications provided through the display of each client device 220, and responsive to an interaction (e.g., select, click-on, touch, hover), the client device 220 can generate an indication identifying a user input or selection of a wager, a live event, a contest 290, an NFT, submittal of a lineup, among others.

Each of the client devices 220 can include or be identified by a device identifier, which can be specific to each respective client device 220. The device identifier can include a script, code, label, or marker that identifies a particular client device 220. In some implementations, the device identifier can include a string or plurality of numbers, letters, characters, or any combination numbers, letters, and characters. In some embodiments, each client device 220 can have a unique device identifier. Each client device 220 can include a client application, which can be a web browser or a native application that communicates with the data processing system 205 to present user interfaces (e.g., the user interfaces 600A-600H of FIGS. 6A-6H), generate one or more data records corresponding to a live event (e.g., a post, a wager, etc.), or other functionality described herein. The application interfaces can be, for example, application interfaces that present different types of configuration interfaces for non-fungible tokens 275 of data processing system 205, such as an interface to update a lineup of contest 290, receive a selection of one or more non-fungible tokens 275 for one or more slots 285 to generate a lineup for a contest 290. The client application can be executing on each client device 220, and may be provided to the client device 220 by the data processing system 205. The application can include a web application, a server application, a resource, a desktop, or a file.

The application can include a local application (e.g., local to a client device 220), hosted application, a SaaS application, a virtual application, a mobile application, or other forms of content. In some implementations, the application can include or correspond to applications provided by remote servers or third-party servers. In some implementations, the application can access the player profiles 270, NFTs 275, rules 280, slots 285, or contests 290 stored and maintained in the database 215, and generate one or more interactive user interface elements, such as the interactive user interface elements described in connection with FIGS. 6A-6H, to a player when executed by a client device 220. Some example interactive user interface elements include user-selectable hyperlinks, buttons, graphics, videos, images, or other application features. Interactions with such interactive user interface elements (sometimes referred to as "actionable objects") can cause the application executing on the respective client device 220 to generate a signal, which can cause the application to perform further operations corresponding to the actionable object.

In some implementations, one or more client devices 220 can establish one or more communication sessions with the data processing system 205. A communication session can include a channel or connection between the data processing system 205 and a respective client device 220. The one or more communication sessions can each include an application session (e.g., virtual application), an execution session, a desktop session, a hosted desktop session, a terminal services session, a browser session, a remote desktop session, a URL session or a remote application session. Each communication session can include encrypted or secure sessions, which can include an encrypted file, encrypted data, or traffic.

In some implementations, in response to interactions with corresponding user interface elements, the application executing on a client device 220 can transmit information, such as player profile 270 information (e.g., changing player profile 270 parameters, changing login information, etc.), interaction information, selections of wager amounts, selections to input members into a lineup, selections to enter a contest 290, selections to submit one or more non-fungible tokens 275 for slots 285 of a lineup for an entered contest 290, selections to request players, plays, or other attributes or potential actions that may occur during an identified live event associated with a contest 290, among other selections described herein. For example, the client device 220 can transmit a request for one or more participants of a live event (e.g., athletes playing for a particular team during a live event, etc.). Additional requests may also be transmitted, including requests to place one or more wagers, view attributes of an NFT 275, or requests for information (e.g., available contests 290, view selection rules, etc.) related to one or more live events, among others. The requests can be hypertext transfer protocol (HTTP or HTTPS) request messages, file transfer protocol messages, email messages, text messages, or any other type of message that can be transmitted via the network 210.

As described herein, a client device 220 can receive one or more interactions with actionable objects presented on the display of the client device. Interactions can be tap interactions, click interactions, or other types of indications that a user is engaged with a particular user interface element. Upon detecting an interaction with a particular user interface element, the client device 220 can execute instructions (e.g., processor-readable code, a script, etc.) that cause the client device 220 to transmit an appropriate signal to the data processing system 205. Additionally, the client devices 220 may receive and display one or more content items or interactive user interface elements that may correspond to one or more non-fungible tokens 275, one or more live events, one or more contests, or one or more live event participants, as described herein.

In some implementations, the application interfaces can present a selectable list of live events (e.g., current or upcoming sporting events, etc.). Upon selection of a live event in the list, or upon a receiving a request to enter a contest 290, the data processing system 205 can provide one or more user interfaces similar to the user interfaces shown in FIGS. 6A-6H, which enable a user to select one or more combinations of NFTs 275 for a lineup or contest, as described herein. Upon receiving one or more selections of the NFTs 275 for slots 285 for a selected contest 290, the data processing system 205 can perform the various operations described herein to determine that a selection rule for each corresponding slot 285 is satisfied and generate a lineup of the NFTs 275 which may be presented on the application interfaces presented at the respective client device.

The database 215 can be a computer-readable memory that can store or maintain any of the information described herein. The database 215 can store or maintain one or more data structures, which may contain, index, or otherwise store each of the values, pluralities, sets, variables, vectors, numbers, or thresholds described herein. The database 215 can be accessed using one or more memory addresses, index values, or identifiers of any item, structure, or region maintained in the database 215. The database 215 can be accessed by the components of the data processing system 205, or any other computing device described herein, via the network 210. In some implementations, the database 215 can be internal to the data processing system 205. In some implementations, the database 215 can exist external to the data processing system 205, and may be accessed via the network 210. The database 215 can be distributed across many different computer systems or storage elements, and may be accessed via the network 210 or a suitable computer bus interface. The data processing system 205 can store, in one or more regions of the memory of the data processing system 205, or in the database 215, the results of any or all computations, determinations, selections, identifications, generations, constructions, or calculations in one or more data structures indexed or identified with appropriate values.

Any or all values stored in the database 215 may be accessed by any computing device described herein, such as the data processing system 205, to perform any of the functionalities or functions described herein. In some implementations, a computing device, such as a client device 220, may utilize authentication information (e.g., username, password, email, etc.) to show that the client device 220 is authorized to access requested information in the database 215. The database 215 may include permission settings that indicate which users, devices, or profiles are authorized to access certain information stored in the database 215. The database 215 may be similar to or include the storage 128 described herein above in conjunction with FIG. 1C. In some implementations, instead of being internal to the data processing system 205, the database 215 can form a part of a cloud computing system. In such implementations, the database 215 can be a distributed storage medium in a cloud computing system and can be accessed by any of the components of the data processing system 205, by the one or more client devices 220 (e.g., via one or more user interfaces, etc.), or any other computing devices described herein.

The database 215 can store one or more player profiles 270 in one or more data structures. Each player profile 270 can be associated with a corresponding player (e.g., a user) of a client device 220 that accesses the functionality of the data processing system 205. In implementations where the data processing system 205 can operate without using a client device 220 (e.g., a slot machine, a video game machine, a standalone wagering kiosk, etc.), a player profile 270 may correspond to a player that accesses the data processing system 205 to place wagers or enter contests 290. Each player profile 270 can be a user profile that includes information about a user. Each player profile 270 may include information about one or more of the client devices 220 used to access the data processing system 205 using the player profile 270. For example, identifiers of a player profile 270 can be used to access the functionality of the data processing system 205 via the network 210. A player profile 270 can contain a private key. This private key can be used to access or associate one or more NFTs 275 with the player profile 270. A private key can indicate or identify to the data processing system 205 that a player owns an NFT 275.

The identifiers of player profiles 270 can include a username, a password, an e-mail address, a phone number, a personal identification number (PIN), a secret code-word, a private key or device identifiers for use in a two-factor authentication technique, among others. The player profile 270 can store information about historic wagers (e.g., including parlay wagers), historic selections of contests 290, historic contests viewed, wagered upon, or entered using the player profile 270, and historic live event outcomes, historic contest 290 outcomes, or other information. The player profile 270 can store a credit balance or wager information (e.g., an amount of a wager, a timestamp associated with a wager, information about the presence of an indication to participate in a bonus opportunity using the wager, a client device identifier of a client device that was used to submit the lineup to the contest 290, the number of contests 290 played using the player profile 270, etc.). The player profile 270 can store and update a counter value based on a lineup generated by the data processing system 205 or an outcome of a contest.

The player profile 270 can store information about a client device 220 used to access the data processing system 205 such as an internet protocol (IP) address, a media access control (MAC) address, a global unique identification (GUID), a player profile 270 name (e.g., the name of a user of the client device 220, a player-chosen username, etc.), device name, among others. In some implementations, a player profile 270 can be created by the data processing system 205 in response to a player profile 270, creation request transmitted by a client device 220. The player profile 270 creation request can include any of the player profile 270 information described herein. In some implementations, a client device 220 accessing the data processing system 205 may not be associated with a player profile 270. In such implementations, the data processing system 205 can automatically create a player profile 270 using an identifier of the client device 220 provided by the client device 220.

The database 215 can store or maintain one or more non-fungible tokens (NFTs) 275 associated with one or more attributes. An NFT 275 can correspond, for example, to an athlete of a team that may participate in a live event (as described herein) and can be associated, owned, possessed, or retained in association with a player profile 270. Ownership of an NFT 275 can be identified by a private key stored in association with a respective player profile. Accessing a private key can indicate to the system 200 the player profile which owns the respective NFT. A private key can be stored locally, such as in database 215, or on a blockchain as described herein.

Attributes of an NFT can include at least a respective rarity value, a respective position value, and a respective participant identifier. For example, the NFTs 275 can have a rarity value corresponding to a "common", "elite" or "legendary" status, a numerical score (e.g., relative to the number of those NFTs 275 in circulation), a percentage, or a color corresponding to a rarity. In some embodiments, the rarity values can correspond to the scarcity of each NFT, as related to the NFTs 275. The participant identifier can be a name of an athlete of a game (e.g., Aaron Rodgers, Josh Allen). The position value can be a position of a player on a sports team, for example. Each NFT 275 can be associated with a respective position value. For example, a respective NFT 275 can be associated with the respective position (e.g., quarterback, running back, etc.) of the athlete (sometimes referred to herein as "participant") to which the NFT 275 corresponds. Attributes of an NFT 275 can include a restriction condition. A restriction condition can be any limitation, restriction, requirement, or qualification necessary to select the NFT for entrance into a contest of the one or more contests 290. For example, a restriction condition can be that the NFT is not to be played in a second contest until a first contest that the NFT is entered in has completed. Attributes of an NFT can include a "superstar" quality. A "superstar" attribute can be a designates the NFT as being able to satisfy one or more overarching contest rules (of the rules 280). For example, a contest rule 280 can indicate that at least one NFT having the "superstar" attribute is required to enter the contest. In some implementations, the "superstar" rule can limit the number of NFTs 275 that are "superstar" NFTs. 275. In some embodiments, an NFT with a "superstar" attribute can be played into any slot of the one or more slots 285, irrespective of the selection rule for that slot.

NFTs 275 can be stored in one or more data structures. In some implementations, the NFTs 275 can be stored on a blockchain without their attributes. For example, an NFT can be stored in the blockchain, but have its attributes maintained on the local database. One or more attributes can be maintained on the local database (e.g., database 215). An NFT can lose or gain attributes, for example, through transfer. For example, if an NFT is transferred from database 215 or from the possession of a player, the NFT can lose its attributes. Attributes of the NFTs 275 can correspond to a respective selection rule 280 of a corresponding slot 285, described herein. For example, a "legendary" rarity may correspond to a selection rule necessitating a "legendary" player in the respective slot 285 of a contest 290. Each NFT 275 can be generated or obtained and stored in the database 215 such that they are accessible by the components of the data processing system 205. NFTs can be minted, mined, generated, or created by components of system 200 or by an external computing system. For example, NFTs can be minted by the data processing system 205, or by an external computing device.

The NFTs 275 can be maintained by a non-fungible token maintainer 240. The non-fungible token maintainer 240 can, in some embodiments, perform the functions described herein with reference to the NFTs 275. The non-fungible token maintainer 240 can modify the attributes of an NFT 275, such as assigning a rarity value or identifier to an NFT. The non-fungible token maintainer 240 can facilitate associating an NFT with a player profile 270 (e.g., to indicate ownership of the NFT, for example). Likewise, the non-fungible token maintainer 240 can facilitate removing an NFT associated with a player profile 270. The non-fungible token maintainer 240 can access an external wallet of a player profile 270 for depositing and transferring NFTs 275. A wallet can be an external storage for NFTs 275 associated with a player profile 270 but not automatically connected to the system 200. For example, the wallet can store NFTs 275 remotely from the system 200. NFTs 275 associated with a player profile 270 can be withdrawn, removed, or transferred from the system 200 to a wallet associated with a player profile 270. A subset of NFTs 275 placed into the player wallet can be returned, deposited, or transferred back to the system 200 associated with the player profile 270. A first wallet of a first player profile can be linked to one or more wallets of other player profiles. In some embodiments, external NFT 275 wallets can be connected via a request from a client device 220 accessing the data processing system 205 using a player profile 270. In some embodiments, use of a wallet can enable NFT 275 transactions between different player profiles 270 on the blockchain.

The non-fungible token maintainer 240 can access the blockchain to make edits to the ownership of an NFT of the one or more NFTs 275 associated with a player profile 270. The non-fungible token maintainer 240 can remove or maintain attributes associated with an NFT. Attributes can be removed or added to an NFT responsive to at least a transfer of the NFT, a win in a contest the NFT was entered into, a software update, a player purchase, or other events. For example, the rarity value of a first NFT can be changed on the blockchain via non-fungible token maintainer 240 in response to an increase in the available NFTs affecting the scarcity of the first NFT. In some implementations, the attributes (e.g. rarity value) of an NFT can be stored locally, separate from the blockchain. For example, the non-fungible token maintainer 240 can store a local copy of attributes associated with an NFT 275 at any time.

The data processing system 205 can store one or more data records in the database 215, for example, in one or more data structures. As described herein, the client device 220 can transmit interaction data to the data processing system 205 in response to selecting a subset of non-fungible tokens 275. The selection of a subset can be received by selection receiver 235. The subset of non-fungible token information can include, for example, any input information as part of the selection (e.g., NFT attributes, which of slots 285 the NFT is to be placed in, etc.), the player profile 270 associated with the client device 220, a contest 290, an identifier of a live event corresponding to the contest, an NFT associated with a wager or contest, a wager identifier, or any other information relating to the NFT. Upon receiving the interaction data, the data processing system 205 can store the interaction data as a data record, in association with the player profile 270 that was used to provide the interaction data. The data records can be records of wagers or contests 290 entered, lineups generated, NFTs 275 selected for entrance into slots 285 of a contest 290, requests to modify a player profile 270, or any other data relating to live events that may be provided via an interaction at a client device 220. In some implementations, the data processing system 205 can store the data record in association with one or more identifiers of a live event or a wagering opportunity of the live event identified in the interaction received from the client device 220.

The selection receiver 235 can accept an input from any of the application interfaces and can communicate that input to the components of the data processing system 205 to at least create a lineup, choose an NFT, edit the player profile 270, select a contest of the one or more contests 290, select a slot of the one or more slots 285, or to place a wager, among other selection-initiated operations described herein. The selections can be received, for example, via a user interface (e.g., user interfaces provided by the data processing system 205 similar to those described in connection with FIGS. 6A-6H, etc.) presented at a client device 220. The selection receiver 235 can receive a request to enter a first contest of one or more contests 290. The selection receiver 235 can receive selections of a subset of NFTs 275 as entrants to the first contest 290. The subset of NFTs 275 can be utilized to generate a lineup for the contest if they satisfy one or more selection rules 280 of the first contest 290. The selection receiver 235 can accept interaction data as described herein.

The database 215 can store or maintain one or more rules 280 associated with one or more corresponding slots 285 of contests 290. The selection rules 280 can be generated by the system 200, or via an external device such as a server, artificial intelligence (AI) rule generator, or in response to the outcomes of other live events. Live events can include, for example, a tennis match, a football game, sub-events of a football game such as which athlete will score the first touchdown, which athlete will score the second touchdown, which team will win the game, or which team will have a greater score at halftime, among others. It should be understood that other events are also possible for live events (e.g., baseball games, hockey games, basketball games, other types of live events, etc.) Furthermore, other sub-events for the aforementioned live events are also possible. An AI rule generator can generate one or more rules 280 based at least upon historic data associated with the player profile 270 and live events. For example, the AI rule generator can parse a history of selections of NFTs 275 into slots 285 of a contest 290 associated with a player profile 270 and ascertain which type (e.g., sporting event, weight values, duration) of contests 290 a player has entered the most, and determine, based on the historical data, which contests 290 a player is most likely to enter in the future.

Selection rules 280 (also known as simply "rules 280") can include conditions for the NFT to be entered into a slot (of slots 285) of a contest (of contests 290). Such conditions can include an NFT having a certain rarity. For example, an NFT having a "legendary" rarity would satisfy a selection rule requiring a "legendary" rarity but would not satisfy a selection rule requiring a "common" rarity. Other conditions can include an NFT having a certain position identifier. For example, an NFT being identified as a "quarterback" would satisfy a selection rule requiring a "quarterback" position identifier, but would not satisfy a selection rule requiring a "receiver" position identifier.

Selection rules 280 can be discrete or continuous. For example, a selection rule can specify that an NFT be a specific rarity (e.g., ELITE, or COMMON) or a selection rule can specify that an NFT be more, less, or in between a specific rarity (e.g., more rare than ELITE). Satisfactory NFTs 275 for a selection rule can be within a range. For example, a selection rule can specify that a satisfactory NFT be between a certain range of rarity, such as ranging from "common" to "elite". This range in this example would exclude "legendary" NFTs. Selection rules 280 can be multifaceted. For example, a selection rule can require both a specific rarity and a specific position identifier. For example, a selection rule can specify a rarity of "common" and a position of "quarterback" needs to be satisfied. Selection rules can be exclusive. For example, a selection rule can indicate that an NFT of a specific rarity cannot be entered into a slot. For example, a selection rule may specify that a slot cannot accept an NFT with a position identifier of "receiver." In some embodiments, a selection rule can be based on a numerical range. For example, a selection rule can specify that a rarity be between 40-80, or 0-100, where the numerical value can correspond to a rarity of an NFT. A selection rule can be based on numerical threshold. For example, a selection rule can specify that an NFT 275 to be entered into a slot 285 not exceed a rarity of 100, or a selection rule can specify that an NFT 275 to be entered into a slot 285 not be under a rarity of 20. Ranges can be exclusive or inclusive, or partially inclusive or exclusive. For example, an inclusive range can be between 0 and 100 and can include 0 and 100. For example, an exclusive range can be between 0 and 100 and not include 0 or 100. A partially inclusive or exclusive range can include a range between 0 and 100 and including either 0 or 100 but not both.

In some embodiments, an NFT must satisfy a selection rule corresponding to the selection rule of the slot. Each slot of the one or more slots 285 can correspond to one or more selection rules of the one or more selection rules 280. In some embodiments, to be entered into a first slot of a first contest, the selection rule of the first slot must be satisfied. For example, to enter into a first slot of a first contest, an NFT must satisfy a selection rule based on rarity, corresponding to the first slot of the first contest. In some embodiments, the selected NFTs must satisfy the selection rule of each slot of a contest in order for a lineup to be generated.

Slots 285 can be selectable components of a contest of the one or more contests 290 which correspond to a selection rule 280. A contest can include one or more slots with different selection rules 280. In some embodiments, one NFT may be entered by the player, via selection receiver 235 and responsive to satisfying the selection rule, per slot. Each slot of the one or more slots can have different scoring mechanisms. For example, a slot of a contest may have a multiplier (e.g., ×2 or ×3) associated with it. Scoring rules can be associated with slots and selection rules 280. For example, a slot with a selection rule requiring the rarity to be "ELITE" may also carry with it a multiplier of "×3." A multiplier can also be associated with a position of a player. A multiplier (e.g., weight) can be associated with a position of an NFT 275 to be entered into a slot 285. The weight can correspond to the points scored by a position. For example, a weight of "5×" can be associated with a linebacker, a weight of "10×" associated with a safety, and no weight associated with a quarterback.

Satisfaction of the one or more selection rules 280 can be determined by the compliance determiner 250. Each NFT of the subset of the NFTs 275 can satisfy a selection rule 280. Compliance determiner 250 can evaluate if an NFT selected by a player satisfies the selection rule of the slot. Compliance determiner 250 can operate via hardware or software. Upon determination of satisfaction of a selection rule, compliance determiner 250 can allow a selected NFT to occupy a slot of a contest. Responsive to no recognition of satisfaction of a selection rule, compliance determiner 250 can reject the addition of an NFT into a slot. Rejection of an NFT due to dissatisfaction of a selection rule can result in a notification to the user via client device 220 over network 210.

Slots 285 can exist within contests 290. In some embodiments, slots 285 can define a lineup for entry into a contest 290, each slot to be filled by an NFT 275 player of the contest 290. Contests 290 can be any game, competition, wager, fantasy draft, or other such event that enables one or more players to compete against each other with a player-submitted lineup of athlete-associated NFTs, based on live events. Contests 290 can be generated at least by the system 200, by a player, or by an external system. Contests 290 can be based around live events as described above. For example, a contest can include rules and contests based upon the duration, sub-events and outcome of a football or other sports game, of a specific period/quarter/half of a sports game, passes thrown or received by participants in a sports game, or other sub-events of a live event or the live event itself. A contest of the one or more contests 290 can be selected by a player via the selection receiver 235. Contests 290 can be updated periodically, such as daily, weekly, or according to a schedule of live events. Contests can be updated by the contest updater 230. Available contests can be visible to a player via a client device 220. Contests can be made unavailable due to at least a time limit expiring, the live event occurring, an existing entrance into the contest by the player, a conflicting contest already having been entered, or a threshold amount of participants already entered into the contest. In some embodiments, not all contests are available to all players. For example, entrance of a contest can be made available only for players who have a received an entrance ticket, allowance, code, right, etc.

In some embodiments, contests 290 into which a player is entered can be visible by other players via the network 120. Entering a contest can refer to submitting a lineup. A lineup can be generated via lineup generator 245. A player can select one or more NFTs which satisfy the respective restriction rules of the slots of the contest, as determined by compliance determiner 250. Lineup generator 245 can generate a lineup responsive to determining that the respective selection rule for each slot of the respective one or more slots of the contest is satisfied. Lineup generator 245 can create fantasy sports lineup that includes each NFT selected by the player. For example, lineup generator 245 can generate a fantasy football lineup of each participant (e.g., athlete) NFT of the chosen subset of the NFTs 275 for the contest.

Speaking now on the operations of system 200, one or more contests can be maintained by the contest updater 230. Maintaining the contests 290 can include adding, removing, modifying, or altering the contests as described above. The contests 290 can be updated in real time or offline, prior to a scheduled live event. The contest updater 230 can update or modify entrance requirements of a contest, such as slots 285 of a contest corresponding to selection rules 280. For example, the contest updater can add, modify, remove, or change the quantity, restriction rules, or types of slots associated with a contest. System 200 can also maintain one or more non-fungible tokens via non-fungible token maintainer 240. Non-fungible token maintainer 240 can update, change, add, modify, or remove any of NFTs 275 on a blockchain. The blockchain can refer to a digital ledger on which ownership information and data corresponding to the NFTs are stored. The blockchain can be maintained on one or more external computing systems. Non-fungible token maintainer 240 can update, change, add, modify or remove attributes associated with the NFTs 275 on the blockchain or locally, such as on database 215.

Still speaking on the operations of system 200, a player can select, via selection receiver 235, a first contest of contests 290 to enter. Selection of a first contest can result in a user interface associated with the contest (such as those discussed in FIGS. 6A-6H) to display on client device 220. Responsive to the selection of a first contest, slots with corresponding selection rules can display. In some embodiments, the player can select (via selection receiver 235) a first subset of NFTs associated with the player profile. Each selected NFT can satisfy a slot and respective selection rule of the slot. Satisfaction of the respective selection rule of each slot by the respective selected NFT of the subset of NFTs can be confirmed by the compliance determiner 250.

Responsive to determining that the respective selection rule of each slot is satisfied, a fantasy sports lineup can be generated by lineup generator 245. The fantasy sports lineup can include the subset of NFTs selected by the player for the first contest. The fantasy sports lineup can be submitted to the contest. Responsive to the submittal of a lineup, a rule modifier 255 can modify a restriction condition for each NFT of the lineup to restrict each NFT of the lineup from entry into another contest. Rule modifier can modify attributes of the NFT in the blockchain to change a restriction condition. A restriction condition can be an attribute which prevents an NFT from being entered into a contest. A restriction condition can be imposed at least due to the NFT already being entered into one contest, or due to being transferred form the player profile prior. In this manner, in some embodiments an NFT can be entered into only one contest.

Figure 3:
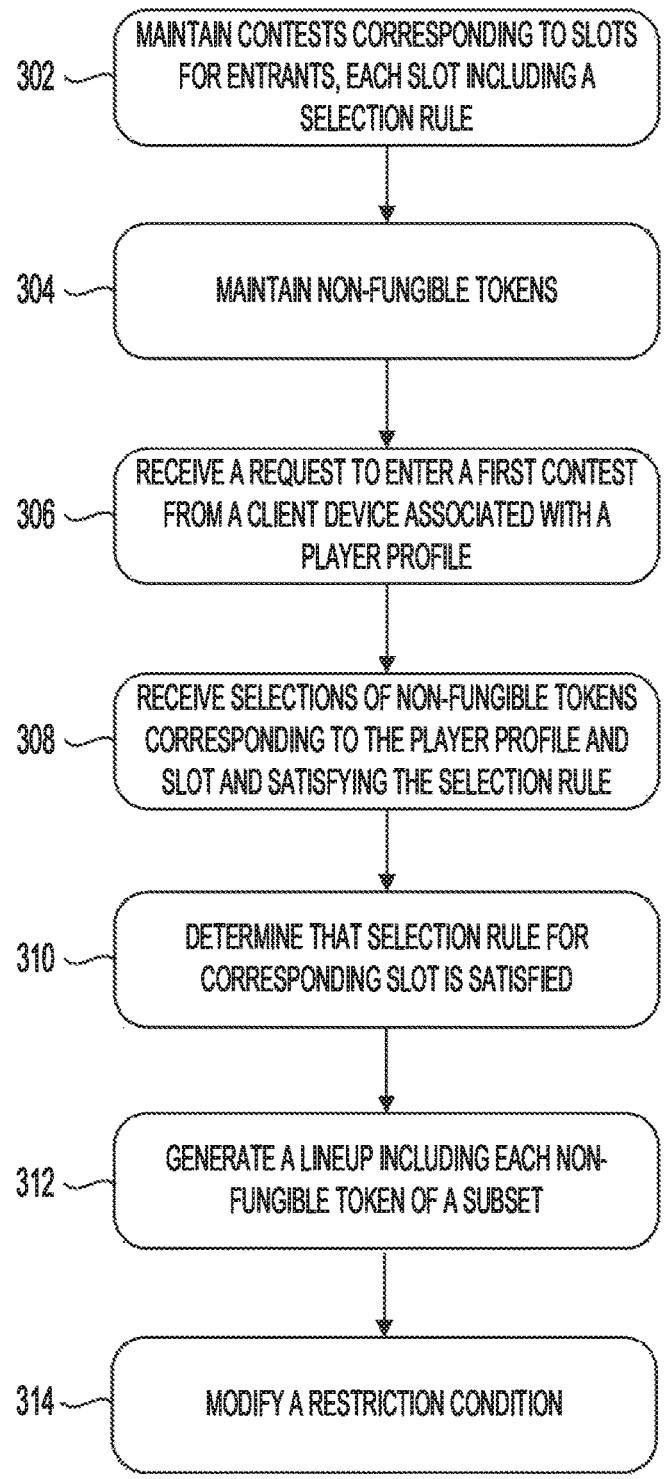
FIG. 3 illustrates an example flow diagram of a method for generating a lineup of NFTs for use in contests, in accordance with one or more implementations.

Referring now to FIG. 3, depicted is an illustrative flow diagram of a method 300 for generating a lineup of non-fungible tokens 275 for use in contests 290. The method 300 can be executed, performed, or otherwise carried out by the data processing system 205, the computer system 100 described herein in conjunction with FIGS. 1A-1D, or any other computing devices described herein. In brief overview of the method 300, the data processing system (e.g., the data processing system 205, etc.) can maintain contests (e.g., the contests 290) corresponding to slots (e.g., the slots 285) for entrants, each slot including a selection rule (e.g., rules 280) (STEP 302); maintain non-fungible tokens (e.g., NFTs 275) (STEP 304); receive a request to enter a first contest (e.g., via selection receiver 235)(STEP 306), receive selections of non-fungible tokens (e.g., NFTs 275) corresponding to the player profile (e.g., player profiles 270) and slot (e.g., slots 285) and satisfying the selection rule (STEP 308); determine that the selection rule for corresponding slot is satisfied (STEP 310); generate a lineup including each non-fungible token of a subset (STEP 312); and modify a restriction condition (STEP 314).

In further detail of the method 300, at step 302, the data processing system (e.g., the data processing system 205, etc.) can maintain contests (e.g., the contests 290) corresponding to slots (e.g., the slots 285) for entrants, each slot including a selection rule (e.g., rules 280). For example, the data processing system 205 can maintain one or more data structures that include the contests 290, which may be stored in association with the respective slots 285 in association with the respective selection rules 280 as described herein. In some implementations, the contests 290 are maintained on a blockchain by contest updater 230. Entrants can refer to NFTs 275 corresponding to members or athletes of a sports team to be entered into respective slots 285 of the contest 290. In some implementations, maintaining the contest can refer to updating, editing, deleting, or adding one or more contests of the one or more contests 290. Maintaining the contest can refer to updating, editing, deleting, or adding slots or respective selection rules to a contest of the one or more contests. Maintaining the contest can further refer to updating a wallet associated with a player profile 270, as described with reference to FIG. 2 herein. The data processing system can calculate or generate contests by scanning through a listing of live events, or may receive (or retrieve, from a storage (e.g., the database 215) of the data processing system) the contests from an external computing system that that is populated with live events. A listing of live events can be provided by a network, the internet via websites, or other electronic means publicly or privately available.

In some implementations, the data processing system 205 can itself generate the corresponding slots 285 and selection rules 280 for a contest. Slots 285 and selection rules 280 can be generated by the system by at least accessing a listing of corresponding contest types and corresponding slots and rules, calculating (based on player profile 270 data) slots and rules a player may be responsive to, or by manual input from an external computing device (not pictured). Corresponding slots 285 for contests 290 can be determined by at least the number of available NFTs 275 a player has, the number of entrants a contest can withstand, common participant quantities for the type of live event the contest is based upon, or input from an external computing device. Selection rules 280 can further be associated with contests 290 themselves. For example, a selection rule may be associated with a contest that restricts players of that contest to those who have received permission to enter. Permission to enter can be granted as an award (e.g., an award for winning one of another contest), by purchase, or as a gift from another player or the system 200. Contests 290 can be public or private. In some embodiments, a public contest can be made available to all or a subset of player profiles 270. In some embodiments, a private contest can be restricted to only certain player profiles 270 within a subset. For example, a private contest can be entered by players who have won an award contest entrance ticket. For example, a subset of players can be selected by a first player for entrance into a private contest.

Maintaining the contests can further include providing instructions to present a user interface that includes one or more indicators of a contest. For example, the system 200 can provide to a client device 220 an interface (such as those described in reference to FIGS. 6A-6H) for presenting one or more available contests 290. Presentation of available contests 290 can include presenting the slots 285 and the respective rules 280 of each slot or contest. The presentation can be updated in accordance with available contests 290. The presentation can be updated periodically, such as daily, weekly, or in response to an update of the contests 290 within the data processing system 205 or the blockchain.

The method can maintain non-fungible tokens (STEP 304). The non-fungible tokens can be maintained, for example, by NFT maintainer 240. As described herein, NFTs can refer to NFTs 275 as described with reference to FIG. 2. Each NFT can be maintained locally or on a blockchain (described herein). NFT maintainer 240 can maintain with each NFT one or more attributes of the NFT. Each attribute can be maintained locally, on a blockchain, or both by the NFT maintainer 240. For example, an NFT may contain a "rarity" attribute. While the NFT itself may be available on the blockchain, the rarity attribute associated with the particular NFT may be maintained locally, such as within database 215.

A blockchain can refer to an immutable digital ledger stored outside the system 200 but accessible by components of system 200 via network 210. For example, a blockchain can refer to a record of transactions of an NFT which is accessible or viewable by many sources. A record of transactions can include actions such as transferring of the NFT from one player to another, the contests participated in by the NFT, or attributes of the NFT (stored on the blockchain) which are edited. For example, the blockchain can be stored in a decentralized network, such that it is not maintainable or accessible by just one device.

Maintenance of the NFT can be accomplished periodically, such as daily or weekly, via a software update, via a request from a player, or by other such means. For example, an NFT can be edited, changed, modified, deleted, or transferred by the NFT maintainer 240 in response to at least a request from a user, the system 200, or an external computing device. Attributes associated with an NFT can change, such as the rarity value or a participant identifier. A rarity value can be related to the scarcity of the NFT in relation to the NFTs available. For example, a "rare Josh Allen" can have fewer NFTs in circulation than a "common Josh Allen." Rarity can be denoted qualitatively or quantitatively. For example, rarity can be described as "rare" or "common" or rarity can be described as a percentage or number (e.g., "70%" or "200"). A participant identifier can include a name of an athlete, such as "Josh Allen." A position identifier can include a position of an athlete. For example, a position identifier could be "quarterback" or "wide receiver." Attributes can be added or removed from an NFT by the NFT maintainer 240.

Maintaining an NFT can further refer to maintain a private key in the player profile 270. For example, each non-fungible token of the set of non-fungible tokens 275 can be associated with the player profile by accessing a private key in the player profile. A private key can refer to a unique identifier of a player profile which enables an NFT to be associated with a player profile, for example, via the blockchain. A private key can, for example, allow a secure encrypted ownership of an NFT.

At step 306, the method 300 can include receiving a request to enter a first contest from a client device associated with a player profile 270. The request can identify the player profile associated with the client device (sometimes referred to as the "requesting player profile"). The request can be transmitted by an application associated with a data processing system, and that executes on the client device. In some implementations, the request may include a string of characters as a search query, which a data processing system can use to filter to available contests 290, identifying contests that match the search query. For example, a data processing system can utilize one or more string matching algorithms to filter the one or more available contests to the subset, such as fuzzy string matching. In response to the request, the data processing system can perform further steps of the method 300. A data processing system can communicate with a user interface for presenting options for selection and receiving the request, for example, via a user interface (e.g., user interfaces provided by the data processing system similar to those described in connection with FIGS. 6A-6H, etc.) presented at a client device. The client device can access a webpage or application resource provided by the data processing system to make selections of combinations of contests to be presented to the player for selection. Available contests for selection can be restricted by a selection rule of the contest. The selections of one or more contests may include Boolean operations (e.g., player A OR player B will score the first touchdown in the live event, player A will score the first touchdown AND player B will score the second touchdown in the live event, etc.). Example selections of contests are shown in FIGS. 6A-6H.

The method 300 can include instructions to present to the user an interface that can include one or more indicators of a subset of the one or more contests 290. The subset can be a filtered subset of contests 290 responsive to a search query. For example, the subset of contests 290 can be responsive to a filter for football contests, or a filter for contests ending before a certain date. Responsive to a user selecting a first contest to enter, the method 300 can generate instructions to present the user interface. The user interface can display requirements (e.g., rules 280) and slots (e.g., slots 285) of the selected contest. Indicators of the contest can include available slots, restriction rules, a time to enter by, a time of the commencement of the contest, or a player's eligibility to participate in the contest. The user interface can include a set of content items (such as those described in reference to FIGS. 6A-6H). Examples of content items can include a content item relating to an NFT of an athlete, a selectable button (e.g., to submit, add, select, or delete), or a content item to display athletes already entered in the contest. The instructions to present via user interface can include allocating and populating one or more data structures for each content item. The display instructions can also be generated to indicate the order that the content items should be displayed in the user interface, such that the content items are arranged in an order to easily make selections of NFTs 275 or contests 290. Each of the content items can include instructions that indicate that the content item is an interactive user interface element that, when interacted with, causes the client device displaying the content item to transmit a request to join a contest.

At step 308, the method 300 can include receiving selections of non-fungible tokens 275 corresponding to the player profile 270 and slot 285 and satisfying the selection rule 280. Receiving selections can create a second subset of NFTs 275. Receiving selections of NFTs 275 can be responsive to a request to enter the first contest and a display of content items of NFTs 275. Selections of non-fungible tokens 275 can mean a subset of the NFTs 275 associated with the player profile 270. For example, a player can select a subset of NFTs of the NFTs 275 which the player already owns and which are associated with the player profile 270. Selections can be received through inputs by the player to an actionable item via a data processing system. Responsive to the request to enter a first contest, a user interface including a set of content items can be provided. Each content item of the set of content items can correspond to a respective NFT of the set of NFTs 275 associated with the player profile 270. A data processing system can communicate with a user interface for presenting options for selection and receiving the request, for example, via a user interface (e.g., user interfaces provided by the data processing system 205 similar to those described in connection with FIGS. 6A-6H, etc.) presented at a client device. For example, the user interface can display content items which include images, names, identifiers, or attributes which identify each NFT of the one or more NFTs 275.

The selections of a set of NFTs 275 can correspond to a respective slot of the respective one or more slots 285 of the first contest. Each contest can include one or more slots 285, as described herein. Each contest can have a one or more slots 285, each slot to be filled by an NFT. For example, a contest can have six slots by which a player can select six NFTs to enter. In some embodiments, a player may not have associated with their player profile 270 enough NFTs 275 to enter a contest. For example, if a contest has six available slots but a player has only five NFTS 275s associated with their player profile 270, the player may not be able to enter the contest. A contest 290 can have any number of slots 285, and the foregoing example of "six available slots" is exemplary and not to be construed as limiting.

Each NFT 275 can contain attributes which can satisfy the selection rule associated with each slot. In order to fill a slot, an NFT can satisfy a selection rule 280 of the corresponding slot 285. Each slot 285 can include one or more selection rules 280 which an NFT can satisfy to fill the slot. In some implementations, a slot can require one or more specific attributes of an NFT 275. For example, a slot can require a rarity of "common" for an NFT 275 to fill the slot. For example, a slot can require a specific position value is satisfied by the NFT 275, such as "wide receiver."

At step 310, the method 300 can include determining that a selection rule 280 for a corresponding slot 285 is satisfied. This determination can be performed by a data processing system. A data processing system can evaluate whether the attributes of the selected NFT 275 satisfy a selection rule of the slot. A data processing system can compare the required attribute as determined by the selection rule 280 to the attributes associated with the selected NFT 275. For example, a data processing system can determine that a selection rule of a respective slot requires a position of "quarterback" and can further recognize whether a selected NFT 275 possesses the position attribute "quarterback." In some embodiments, checking the attributes of an NFT 275 can include accessing data of the NFT 275 from where it is stored. For example, the data processing system can access a remote (e.g., blockchain) or local (e.g., database 215) storage to retrieve the attributes of one or more NFTs 275. The data processing system can then, in some embodiments, compare (e.g., via software, a comparator, or a computing device) one or more attributes of one or more NFTs 275 with the attributes described in the selection rule 280 of a slot 285.

The method can further include generating instructions to display (via a user interface) an indication to the player that an NFT 275 does not satisfy a selection rule 280 for a respective slot. For example, a data processing system can display content items similar to those depicted in FIGS. 6A-6H to indicate to the player that their selected NFT 275 does not satisfy a selection rule 280. Responsive to an NFT 275 not satisfying a selection rule 280, a data processing system can further generate instructions to enable the player to return back to the subset of NFTs 275.

Upon determining that a selection rule 280 for each corresponding slot 285 is satisfied by the selected NFTs 275, the method 300 can progress to step 312. Method step 312 can include generating a lineup including each non-fungible token of a subset. Responsive to determining that the respective selection rule 280 for each slot of the respective slots 285 of the first contest is satisfied, the method 300 can generate (e.g., via lineup generator 245) a fantasy sports lineup that includes each non-fungible token of the second subset of the plurality of non-fungible tokens 275 for the first contest.

A fantasy sports lineup can be a combination of NFTs 275, corresponding to a particular sport, which can be entered into a contest of the one or more contests 290 in order to score points, win awards, or make wagers regarding the entrants and contest, responsive to a live event. A fantasy sports lineup can include athletes from different teams. For example, a fantasy sports lineup can include members from each the Giants, the Jets, and the Bills (all of the National Football League). A fantasy sports lineup (e.g., "a lineup") can be used to compete against other players in the same contest. A fantasy sports lineup can generate points, awards, or wins based on at least the status of the teams of each selected NFT 275. For example, a defensive player from the Jets can generate points, awards, or wins based on the Jets themselves, not exclusively the selected player.

Generating a lineup can include entering and submitting the fantasy sports lineup into a contest. Prior to submittal of a lineup, a player can, in some embodiments, review the selected NFTs 275 for entrance into the lineup. Generating the lineup can include transmitting a content item to the client device which indicates each NFT 275 of the set included in the fantasy sports lineup. In some embodiments, a content item can be generated and displayed (e.g., like those in FIGS. 6A-6H) which indicate to the user their chosen lineup. For example, a content item can display that displays Josh Allen, Tom Brady, Johnathan Abram, Patrick Mahomes, and Aaron Rodgers in a lineup. The content item can further display a selectable content item to submit the lineup for entrance into the first contest. Prior to or concurrent with the start of a contest, the data processing system can access attributes of each NFT 275 of the lineup from storage (such as database 215 or the blockchain). In some embodiments, a data processing system can store attributes associated with each NFT 275 of a lineup locally, separate from the blockchain, such as within database 215. This local copy can enable faster processing of the contest and reduce latency issues associated with repeated queries of the blockchain.

The method can further include act 312 updating a counter value in the player profile based on the fantasy sports lineup and an outcome of the contest. A counter value can be stored or associated with the player profile. A counter value can include one or more quantities to be incremented or decremented based on at least a number of wins/losses/ties of contests, entrances of an NFT 275 into a contest, awards won, or score for the profile calculated on the aforementioned. The counter value can be modified in response to at least the fantasy sports lineup as described herein and an outcome of the contest. An outcome of the contest can include a win, a loss, a tie, a specific sub-event occurring (such as a touchdown in the first quarter, a pass being completed, or a yard line being reached). For example, a counter of the player profile may increment if a specific NFT is entered into the contest and the player wins the contest. In some embodiments, an NFT 275 can have a counter value. For example, an NFT 275 can have associated with it a counter value which can increment for each outcome (e.g., win/loss/tic) of a contest.

Method 300 can include step 314, wherein a restriction condition is modified. NFTS 275s can contain attributes, and in some embodiments, one of those attributes can be a restriction condition. The restriction condition can, responsive to an NFT 275 being entered into a lineup for entrance into a contest, be modified by the rule modifier 255. The rule modifier 255 can update a restriction condition of an NFT 275 to disallow use of that NFT in another contest while still entered into the first contest. In this manner, an NFT 275 can be entered into only one contest of the one or more of contests at a time.

C. Determining the Outcome of a Tie and Establishing a Placeholder

The systems and methods of this technical solution provide techniques for determining the outcome of a tie of a contest based on edition numbers and establishing a placeholder. Non-fungible tokens can be utilized as both entrants of the contest and as an award of the contest. These NFTs can be stored on a decentralized blockchain. When using NFTs as an award for a contest, there must be a way to break ties of the contest due to the non-fungible nature of award NFTs. Existing technical solutions provide divisible rewards, such as credit value, and therefore do not break ties, and instead divide awards between successful contest entrants. However, such approaches are incompatible with indivisible contest awards, leading to players being unfairly disadvantaged when a contest results in a tie. The systems and methods described herein provide tiebreaker functionality that improves upon existing contest systems. Additionally, the systems and methods described herein can address the issues that occur when a player transfers an NFT of an athlete that is currently entered into a lineup of a contest, and can address latency issues associated with accessing information corresponding to NFTs that are stored on a blockchain, which can be computationally slow and introduce system bottlenecks.

The systems and methods described herein implement both a tic breaking system and a placeholder system for contests utilizing NFTs as entrants or as contest awards. The systems and methods described herein can break ties between players of contests as well as institute a placeholder for NFTs that have been transferred prior to the start of a contest. The tie breaking mechanism can be based on at least the NFTs each being associated with a respective edition number. In some implementations, the edition numbers can be summed to determine the outcome in the event of a contest tie. A placeholder can be implemented within a lineup of a contest to enable a player the flexibility of transferring an NFT away while still being able to participate in a contest. The placeholder can be a substitute for an NFT if it is transferred prior to the start of a contest. Ties can be broken in a way that is fair for all players as well as enable players to both enter contests and sell NFTs simultaneously. Furthermore, the systems and methods described herein can store attributes associated with an NFT in a local storage at the start of the contest to enable faster processing than continuously accessing these attributes on the blockchain would allow for.

Figure 4:
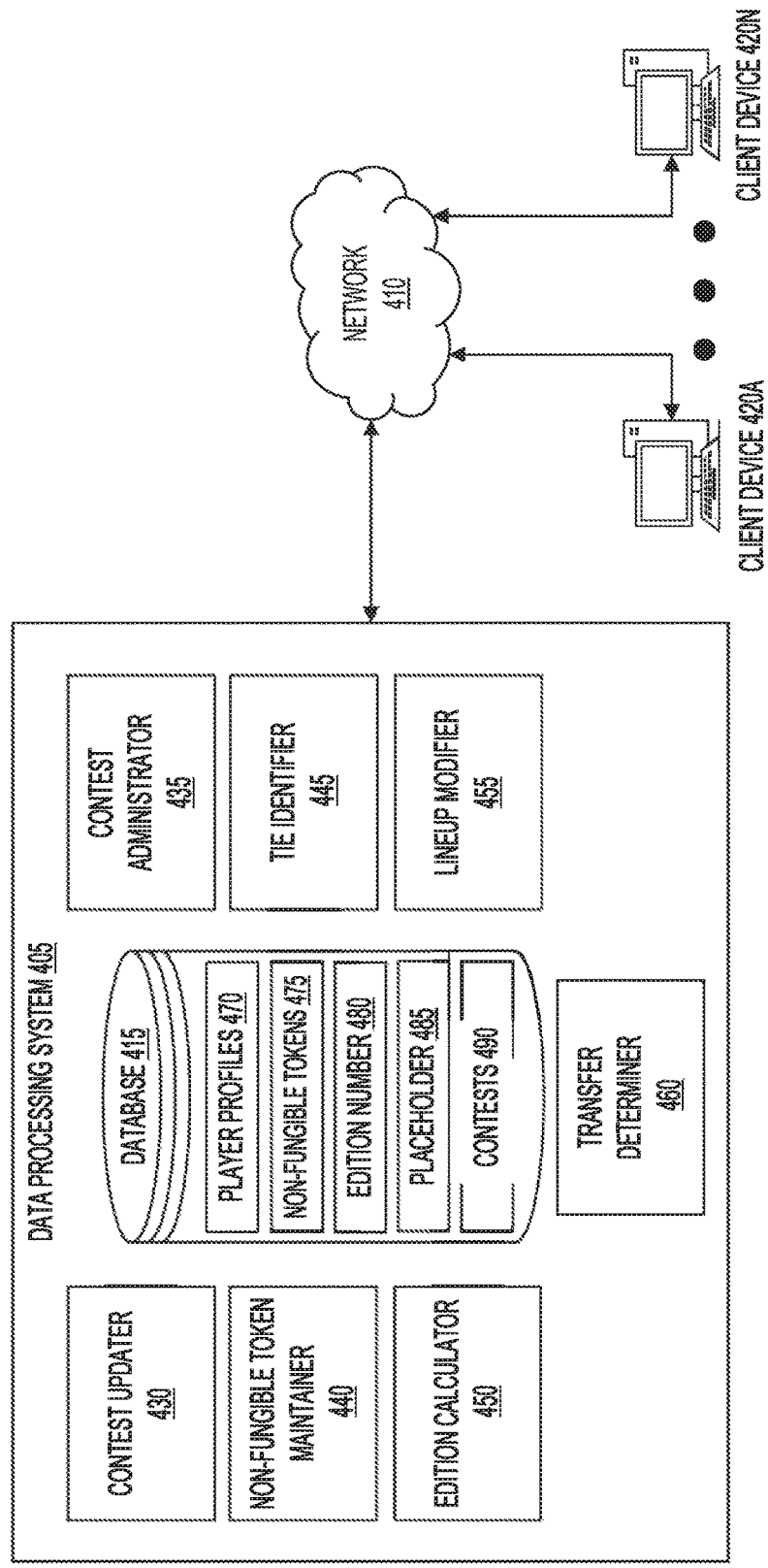
FIG. 4 is a block diagram of an example system for determining an outcome of a tie between multiple players of a contest based on edition numbers of entrant NFTs, in accordance with one or more implementations.

Referring now to FIG. 4, illustrated is a block diagram of an example system 400 for systems and methods for determining the winner of a tie of a contest based on edition numbers and for establishing a placeholder in the event of an NFT transfer. The system 400 can include at least a data processing system 405, a network 410, and one or more client devices 420A-420N (sometimes generally referred to as the "client device(s) 420"). Data processing system 405 can include database 415, contest updater 430, contest administrator 435, non-fungible token maintainer 440, tie identifier 445, edition calculator 450, lineup modifier 455, and transfer determiner 460. In some implementations, database 415 can be external to the data processing system 405, and may be accessed by the data processing system 205 via one or more computer networks (e.g., the network 210). The database 415 can store or maintain one or more player profiles 470, non-fungible tokens 475, edition number 480, placeholder 485, and contests 490.

Each of the components (e.g., the data processing system 405, the network 410, the database 415, and the client devices 420) of the system 400 can be implemented using the hardware components or a combination of software with the hardware components of a computing system (e.g., computing system 100, etc.) described in connection with FIG. 1 in Section A. Each of the components of the data processing system 405 (e.g., contest updater 430, contest administrator 435, non-fungible token maintainer 440, tie identifier 445, edition calculator 450, lineup modifier 455, and transfer determiner 460) can be implemented in hardware, software, or a combination of hardware and software, and can perform the functionalities detailed herein.

The data processing system 405 can include all of the structure of, and can perform any of the functionality of, the data processing system 205 described in connection with FIG. 2. Similarly, each of the network 410 and the client devices 420 can include all of the structure of, and can perform any of the functionality of, the network 210 and the client devices 220, respectively, described in connection with FIG. 2. Likewise, the database 415, and the player profiles 470, the NFTs 475, and the contests 490 can be similar to, include all of the structure of, and perform any of the functionality of, the database 215, the player profiles 270, the NFTs 275, and the contests 290 respectively, described in connection with FIG. 2.

It should be understood that while operations that are different from those described in connection with FIG. 2 are described in connection with FIG. 4, that any of the computing devices of FIG. 4 can perform any of the functionality of the computing devices described in connection with FIG. 2, and vice versa. It will be appreciated that any of the components of the data processing system 405 may be present in the data processing system 205 of FIG. 2, and vice versa.

Referring now to the operations of the data processing system 405, the NFT maintainer 440 can maintain one or more NFTs 475 stored on a blockchain and associated with a respective edition number 480. The NFTs 475 can be stored on a blockchain and accessed at any time by the NFT maintainer 440. The NFTs 475 can be maintained, updated, or accessed at least in response to a user selection from an application via a client device (e.g., client device 404), a software update, a request from the system (such as by contest administrator 435, NFT maintainer 440, tie identifier 445, edition calculator 450, lineup modifier 455, or transfer determiner 460, described herein) or a change in a live event (e.g., a sports game being cancelled or postponed, an athlete being injured). The NFTs 475 can be stored within database 415 and accessed for similar reasons as on the blockchain. The one or more NFTs 475 can include attributes as described above in conjunction with NFTs 275 in Section B. Each attribute of NFTs 475 can be stored on the blockchain, in the database 415, or both. NFT maintainer 440 can maintain attributes simultaneously kept on the blockchain, database 415, or both.

Attributes of an NFT 475 can include an edition number 480. Edition number 480 can be a number associated with an NFT 475 which can be useful in determining ties of contests 490. Each individual NFT 475 can have a corresponding edition number 480. In some embodiments, an edition number 480 can be associated with minting of that NFT. An NFT 475 can be minted, created, or established by the system 400 or by an external computing device. In some embodiments, minting an NFT 475 can refer to writing a new NFT to the blockchain. An edition number can be generated for an NFT 475 upon an NFT's minting. Edition numbers 480 can increment based at least upon the order of an NFT's minting. For example, a first Josh Allen NFT minted by the system before a second Josh Allen NFT is minted by the system can have a lower edition number than the second Josh Allen NFT. The respective edition numbers of each NFT 475 can be accessed from a local database that is separate from the blockchain, such as database 415. Storage of the respective edition number of each NFT 475 associated with a contest can be responsive to a contest start time, described herein. Edition numbers can be accessed from a local storage of the system 400 at any time, such as periodically, in response to entrance of a contest, in response to completion of a contest, or in response to a tie between two or more players. Edition numbers can be stored in a data structure, such as a look-up table, listing, or spreadsheet, separate from the blockchain. Edition numbers 480 of NFTs 475 used as entrants to a contest 490 can be copied, stored, or moved from the blockchain to the separate storage (e.g., database 415) once the contest 490 has initiated or commenced, as described herein.

The attributes can further include a restriction attribute that restricts the usage of the NFT 475 once the NFT has been used to enter a contest, or once the ownership of the NFT 475 has transferred from the respective player profile 470. For example, if an NFT has been entered into a lineup (as described herein), the attribute of the NFT can be updated to restrict entrance of that NFT into another contest.

The tie identifier 445 can determine that an outcome of a contest (of contests 490) indicates a tie. The contests 490 can be similar to the contests 290 described herein. Contests 490 can correspond to live sporting events or sub-events of a live sporting event, for example. Examples of contests 490 can be fantasy football contests. Examples of a live sporting event include a football game or a soccer match. Sub-events can be events of note within the live sporting event, such as a first down or touchdown. A player profile 470 can submit a lineup of NFTs 475 into a contest as described herein. One or more players associated with a respective player profile 470 can each submit a lineup to a contest. In this manner, a player's lineup can compete against one or more other player's lineups. A contest between one or more players can result in a tie. A tie can be caused at least by one or more lineups or NFTs 475 earning, scoring, or gaining the same amount of points at the termination of the contest.

Determination of a tic can be responsive to the termination of a contest. A contest can terminate due to at least the completion of a live event, a threshold score being reached, a withdrawal from the contest by a player, or a threshold of time of a contest being exceeded. The data processing system 405 can determine a tie by any software or hardware means, such as a comparator or comparison software. The discovery of a tie can be communicated to other components of the data processing system 405, such as the contest updater 430, NFT maintainer 440, contest administrator 435, tie identifier 445, lineup modifier 455, transfer determiner 460, or edition calculator 450. A tie can be recorded in the database 415 in association with a respective contest via contest updater 430. A tie can be associated with and stored with a respective player profile.

The contest updater 430 can maintain or update one or more contests 490. Each contest 490 can be similar to contests 290 as described herein. The contest updater 430 can likewise perform similar functionalities to those described in reference to the contest updater 230. The contest updater 430 can maintain a one or more contests 490. Maintaining a contest can refer to at least updating, changing, editing, modifying, adding, or removing a contest from the one or more contests available to the player. The contest updater 430 can update one or more contests 490 in response to at least a request from a client device (e.g., a client device 420), a periodic update (e.g., daily, weekly), a software update (e.g., from an external computing device, not pictured), an update from the data processing system 405 or its components (e.g., from contest administrator 435, NFT maintainer 440, tie identifier 445, edition calculator 450, lineup modifier 455, or transfer determiner 460, described herein), a change in a live event (e.g., a sports game being cancelled or postponed, an athlete being injured), or the determination of a tie. Contest updater can display, via an application on client device 420, the number of ties resulting from a terminated contest of the contests 490. For example, the completion of a contest associated with a live event can trigger the contest updater 430 to send instructions to a display device to display information related to a tie of the contest.

Maintaining a contest can further refer to maintaining a contest selection rule. A selection rule can be similar to the rules 280 described in reference to FIG. 2. Maintaining a contest selection rule can entail modifying, changing, adding, deleting, or preserving one or more selection rules associated with a contest. To maintain a contest 490, the contest updater 430 can allocate one or more regions of memory, for example, in a database (e.g., the database 415) for one or more data structures that can include information related to the established contest. The contests 290 can be stored in the database 415, or in an external computing system and accessed by the data processing system 405 via the network 410. The contest updater 430 can update the contest stored on the blockchain. The blockchain can be a digital ledger as described herein.

A request from a player to update a contest may identify the player profile 470. The request can be transmitted by a client device 420, for example, via an application executing on the client device 420. The application can be used to access the functionality of the contest updater 430 using a player profile 470. As described herein, the client device 420 may utilize login credentials or other forms of authentication to access the functionality of the contest updater 430 with the corresponding player profile 470. The application executing on the client device 420 can present one or more interactive user interface elements on a display of the client device 420, such as the user interface elements described in connection with FIGS. 6A-6H. When an interaction is detected with one of the user interface elements (e.g., a "Select Contest" user interface element, etc.,) the client device 420 can transmit a corresponding request to enter a contest, with the player profile 470 used by the client device 420 to access the functionality of the data processing system 405.

Responsive to the determination of a tie by tie identifier 445, the edition calculator 450 can calculate, based on the respective edition number of each non-fungible token of the first lineup and the respective edition number of each non-fungible token of the second lineup, a first edition number total of the first lineup and a second edition number total of the second lineup. The edition number can calculate using software (e.g., like software 110 described in FIG. 1B). The edition calculator can determine the outcome (e.g., the final result) of the contest indicates a tie by performing operations that can include determining a first value of points associated with the first lineup is equal to a second value of points associated with the second lineup. For example, the edition calculator can sum each edition number of each NFT in a lineup entered into a first contest, associated with a player profile. In some embodiments, that sum can then be compared to a similar sum associated with a second lineup of a second player profile of the first contest.

In some embodiments, lineups can be scored (e.g., accumulate points in a contest 490) based on at least the performance of athletes or the performance of a team. A play or an action by an athlete in a lineup can be scored (e.g., earn points in a contest 490 for a player profile 470) in response to detecting performance of one or more plays or action by the athlete during one or more live events. A play or an action can include notable events that occur during a sports game, such as a player scoring a first down, a pass, or scoring a goal or touchdown, among others. For example, a first down by a first athlete in a lineup of a first contest can score a respective number of points for a player. Indications of points can be received from external computing systems. For example, an indication of a first down by a first player can be received by the system 400 or 200 and can subsequently be processed by the data processing system 405 or 205 to score points for the first player in a lineup of a contest entered by the player. In some embodiments, scores for lineups entered into a contest can be scored based on the performance of the team associated with a first player of a lineup. For example, a first athlete entered into a lineup of a contest corresponding to a first team by a player can earn for the player based at least on the performance of the team corresponding to the first athlete. For example, if the first team wins a live event, an athlete of that team can score points in the lineup created by the player, regardless of the athlete's actions. Actions and performances of athletes and teams can be associated with a multiplier or weight for scoring. In some embodiments, one or more actions can be scored with a multiplier. For example, a touchdown scored in a live event can scores "5×" points for an athlete in a lineup of a contest corresponding to that live event and entered by a player.

The edition calculator 450 can select one of the first lineup or the second lineup by performing operations including determining that the first edition number total is greater than the second edition number total. The selection of the first lineup or the second lineup can indicate a loser or a winner of the tie. In some embodiments, if the summed total of a first player's lineup's edition numbers in a contest is less than the summed total of a second player's lineup's edition numbers in the contest, the first player can be determined to be the winner. Vice versa, in some embodiments, if the summed total of a first player's lineup's edition numbers in a contest is greater than the summed total of a second player's lineup's edition numbers in the contest, the first player can be determined to be the winner. In some embodiments, there can exist one or more winners, one or more losers, or an ultimate tie. In some embodiments, if there are more than one winner, an award can include a duplicate prize (e.g., a duplicate entrance ticket or NFT 475), a divisible prize (such as money) or can be held in abeyance until a subsequent contest including the one or more winners of the first contest. In some embodiments, if there exists an ultimate tie of summation of edition numbers, the tie can be broken by at least a random selection by the system 400 or by a subsequent contest in which the tie players are each entered.

The contest administrator 435 can dispense one or more awards to the one or more winners of the contest as determined by edition calculator 450. In some embodiments, an award can be at least a ticket to enter a second contest, an NFT 475, special attributes for an NFT 475 already associated with the player profile, or money. In some embodiments, an award can be split amongst a one or more winners, such as an award of money. In some embodiments, an award can be duplicated to be dispensed to more than one winner, such as an entrance ticket to a second contest. Duplicated can refer to transmitting a request to mint a second award NFT which mimics the attributes of the first award NFT. In some embodiments, an award cannot be split, such as an award NFT. An award NFT can be dispensed, awarded, or otherwise associated with the player profile 470 of one winner of a contest. Responsive to determining that a contest 490 provides an award NFT, the system can configure at least the tie identifier 445 or the edition calculator 450 to determine the existence of a tie. Due to the non-fungible (e.g., indivisible, inseparable, unitary nature) aspect of an NFT 475, an award NFT 475 can be award wholly to a singular winner by the contest administrator 435.

The contest administrator 435 can generate instructions to the system 405 to transfer an award to the player profile associated with the winning player of a contest. The award can be transferred from an external computing device (not pictured) via the network 410. The award can be stored in association with the player profile 470 in database 415 or on the blockchain. In some embodiments, the award can be non-transmittable. For example, an award NFT 475 for a first player winner of a contest may not be transferred to a second player. This transfer restriction can be stored as an attribute of the NFT 475.

Transfer determiner 460 can determine, based on the blockchain, that a first non-fungible token of a first lineup of a first contest of the active contests 490 has been transferred to a second player profile. Active contests can refer to contests 490 or a subset of contests 490 which are displayed to and enterable by a player (e.g., have not yet started or have not yet completed). In some embodiments, a subset of the NFTs 475 can be transferrable. This subset can be transferred from a first player to a second player, or from a first player to a marketplace of NFTs 475. A marketplace of NFTs 475 can be any platform, application, or software for listing an NFT 475 for sale or trade. The marketplace can be accessed by one or more players via the data processing system 405 or via an external computing system. Transfers of NFTs 475 can be sales or gifts. Transfer of an NFT can change or alter its attributes, such as edition number, rarity, or a restriction. For example, transferring an NFT 475 can change a restriction condition attribute of an NFT 475 to restrict the NFT 475 from use. In some embodiments, transferring an NFT 475 to the marketplace can associate the NFT 475 with a listing flag. A listing flag can be an attribute of an NFT 475 (maintained by the NFT maintainer 440) which indicates that the NFT 475 is for sale or trade on the marketplace.

An NFT 475 can be transferred at any time, regardless of the entrance of an NFT 475 into a lineup. For example, a first player can submit a first NFT 475 into a lineup for use in a contest, and then transfer the first NFT from the first player's profile to the marketplace or to a second player's profile. Transferring an NFT can be recorded on the blockchain. Transfer determiner 460 can determine that a first NFT 475 which has been entered into a contest has been transferred by referencing the blockchain. For example, transfer determiner 460 can access the blockchain to see the transaction of the first NFT has occurred subsequent to the entrance of the first NFT into a lineup. In some embodiments, transferring the first NFT of the first lineup to a second player profile can include accessing a private key associated with the first player profile. The private key can be as described herein.

Transfer determiner 460 can further determine that a second NFT of the first lineup is associated with a listing flag as described above. For example, an NFT 475 can be associated with or have the attribute of a listing flag if it is listed for sale by the first player on an NFT marketplace. Responsive to the determination, transfer determiner 460 can generate, prior to a start time of the first contest, a notification for transmission to a client device (e.g., client device 420) associated with the first player profile indicating that the second NFT is associated with the listing flag. A notification can be displayed on client device 420 via an application. The notification can be like those described in reference to FIGS. 6A-6H. In some embodiments, the notification can indicate to the first player that the selected NFT 475 is currently for sale in the marketplace. In some embodiments, the notification can warn the first player that if the selected NFT 475 is sold during the execution of the contest, the NFT 475 can be replaced with a placeholder 485 as described herein. Likewise, in some embodiments, if the second NFT is not for sale or trade on the marketplace, the transfer determiner 460 and NFT maintainer 440 can restrict the second NFT of the first lineup from being associated with a listing flag responsive to executing the first contest, to prevent it from being listed on the marketplace.

Responsive to determining that the first NFT has been transferred to a second player profile or to the marketplace, the lineup modifier 455 can modify the first lineup to include a placeholder in lieu of the first NFT. The placeholder can be any stand-in, replacement, or NFT 475 which can enable the user to still compete in the contest without still having possession of the first NFT. For example, if a first player sells his Josh Allen NFT on the marketplace, subsequent to entering the NFT into a lineup but prior to commencement of the contest, the lineup modifier can display a placeholder 485 for the Josh Allen NFT. In some embodiments, the placeholder can be entered into the lineup subsequent to the commencement of a contest. For example, an NFT 475 can be transferred from a player subsequent to the start of a contest, enabling the system to then display a placeholder for the transferred NFT. The placeholder NFT can display to the player similar to as shown in FIGS. 6A-6H. The placeholder can be a grayed-out icon of the first NFT. The placeholder can maintain some, none, or all attributes of the first NFT.

The placeholder can enable the first player entrance into the contest for which he has already generated a lineup.

The placeholder may not accumulate points for the lineup when the contest is executed, or may accumulated reduced points (e.g., multiplied by a reduction factor), or may only accumulate certain points (e.g., according to a placeholder point policy). In some embodiments, the placeholder can score points for the corresponding player in the lineup entered into the contest. In some embodiments, a placeholder can be generated when the NFT has been sold in the marketplace while having already been submitted for a lineup to a contest.

The contest administrator 435 can further execute the first contest based on the modified first lineup including the placeholder. For example, the contest administrator 435 can execute a contest in which the first NFT of the first lineup of the first contest has been sold on the marketplace when a placeholder has been entered for the slot of the first NFT. During execution of the contest, the placeholder can earn at least one point and at most the amount of points of the first NFT which has been transferred. The amount of points of the first NFT which has been transferred can be determined through the execution of contests 490. The execution of contests 490 can include accumulating points for a lineup as described herein, based on the NFTs 475 used to entered generate the lineup. In some embodiments, each NFT 475 of a lineup corresponds to a player of an existing sports team. For example, a first NFT can correspond to Josh Allen of the Buffalo Bills and can score points in the lineup corresponding to Josh Allen of the Buffalo Bills real-life performance. For example, the performance of Josh Allen or the Buffalo Bills can correspond to an accumulation of points for the players of the contest in which a Josh Allen NFT is entered into the lineup.

Figure 5:
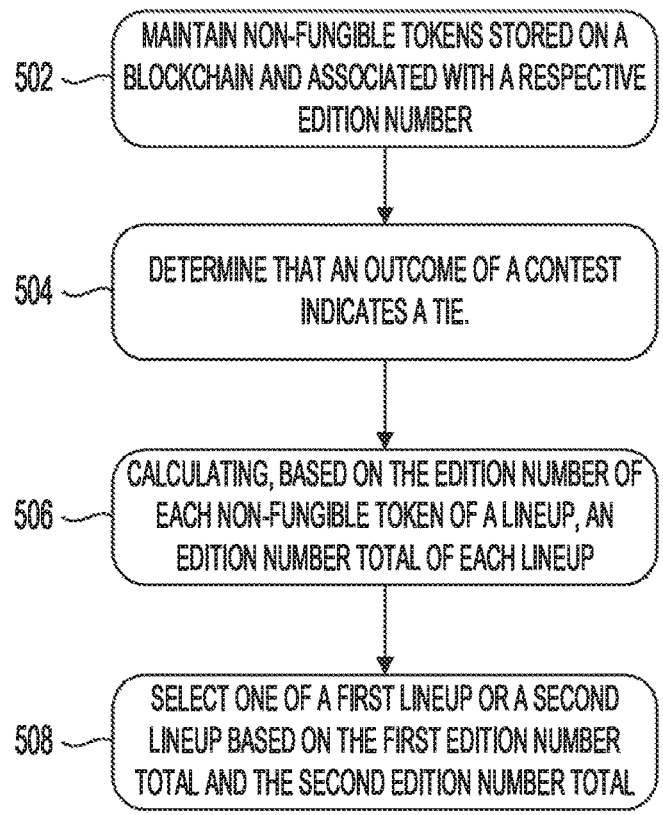
FIG. 5 illustrates an example flow diagram of a method for determining the winner of a tie of a contest based on edition numbers, in accordance with one or more implementations.

Referring now to FIG. 5 in the context of the components described in FIG. 4, depicted is an illustrative flow diagram of a method 500 for determining the winner of a tie of a contest based on edition numbers. The method 500 can be executed, performed, or otherwise carried out by the data processing system 205 described in connection with FIG. 2, the data processing system 405 described in connection with FIG. 4, the computer system 100 described in connection with FIGS. 1A-1D, or any other computing devices described herein. In a brief overview, the method can include maintaining non-fungible tokens stored on a blockchain and associated with a respective edition number (STEP 502), determining that an outcome of a contest indicates a tie (STEP 504), calculating, based on the edition number of each non-fungible token of a lineup, an edition number total of each lineup (STEP 506), and selecting one of a first lineup or a second lineup based on the first edition number total and the second edition number total (STEP 508).

In further detail of the method 500, at step 502, the method 500 can include maintaining non-fungible tokens stored on a blockchain and associated with a respective edition number. Each NFT 475 can be maintained or the blockchain or in database 215. Each NFT of the NFTs 475 can be maintained at least periodically (e.g., daily or weekly), in response to a software update from an external computing device, in response to a change in a contest, in response to transferring an NFT, or in response to an input from a user on a client device.

Maintaining an NFT can further include accessing attributes of the NFT 475. For example, maintaining an NFT can include accessing, by the one or more processors, a respective edition number 480 of an NFT 475. In some embodiments, an edition number can be an attribute associated with an NFT which can indicate the order in which the NFT was procured (e.g., the first Josh Allen, a second Josh Allen), which can further be used to break ties in contests. Step 502 can further include accessing, by the one or more processors, the respective edition number of each non-fungible token of the first subset and the respective edition number of each non-fungible token of the second subset from a local storage that is separate from the blockchain. The respective edition numbers of each NFT 475 can be stored locally, such as in database 215. The edition number can be copied, stored, accessed from the blockchain at any time to be stored as an imprint in a local storage separate from the blockchain. The processors can access the locally stored edition number at any time, such as in response to a change in an attribute of an NFT 475, periodically, in response to the start of a contest, or in response to a determination of a tie. Step 502 can include storing, by the one or more processors, the respective edition number of each non-fungible token of the first subset and the respective edition number of each non-fungible token of the second subset in association with the contest at a contest start time. For example, when a contest starts, the respective edition numbers 480 of the NFTs 475 entered can be copied from the blockchain to a local storage to enable faster processing.

At step 504, the method can include determining that an outcome of a contest indicates a tie. The contest indicating a tie can include two or more players of the contest, who have each entered NFTs into a lineup to compete, earning the same score in the contest at the completion of the contest. The outcome of the contest can be when the contest has completed and final scores for each player have been determined. The contest can include a first lineup having a first subset of the one or more non-fungible tokens and a second lineup having a second subset of the one or more non-fungible tokens. For example, a first player to enter the contest would enter a first lineup and a second player to enter the contest would enter a second lineup. A contest can extend beyond two players to include three or more players. A tie can be earned among at least two players.

In some embodiments, determining a tie is responsive to determining that an award of the contest includes an award non-fungible token. A contest can include an award. An award can be any item (virtual or physical), entrance, money, or preference given to a winner of a contest. For example, an award can be $50, a ticket to enter a second contest, or a special attribute bestowed upon an NFT associated with the a player's profile. An award can be an NFT. In some embodiments, an award of the one or more awards can be split in the event of a tie, such as a monetary award. In some embodiments, an award cannot be split in the event of a tie. In some embodiments, an award NFT cannot be split in the event of a tie. In some embodiments, a second NFT with attributes which mimic the first award NFT can be minted in response to a tie. Determining a tie can be done in response to determining that the award is an NFT. For example, the operations of the method described herein can be in response to the award including an NFT 475.

Determining the outcome of the contest indicates a tie can include determining a first value of points associated with the first lineup is equal to a second value of points associated with the second lineup. For example, a first player entered into a contest can earn points based on at least the lineup entered into the contest. A second player can earn points in a similar manner for the second lineup. In some embodiments, if the value of points associated with the first lineup equals the value of points associated with the second lineup at the completion of the contest, a tie can be determined.

At step 506, the method 500 can include calculating, based on the edition number of each non-fungible token of a lineup, an edition number total of each lineup. Calculating the total can be responsive to determining that the outcome of the contest indicates the tie, as described in reference to step 504. Calculating the respective total of each player can be based on the respective edition number of each non-fungible token of the first lineup and the respective edition number of each non-fungible token of the second lineup. For example, a first player can have a lineup including one or more NFTs, each NFT 475 having a respective edition number 480. A second player can have a second lineup, including one or more NFTs, each NFT having a respective edition number. Each player can have a respective edition number total. Edition numbers can be repeated; for example, a first NFT with a first identifier can have the same edition number as a second NFT with a second identifier.

Calculating an edition number total can include summing a first edition number total of the first lineup and a second edition number total of the second lineup. In some embodiments, calculating the first edition number total of the first lineup comprises summing, by the one or more processors, the respective edition number of each non-fungible token of the first subset. For example, a first lineup including five NFTs, each NFT having a respective edition number of 1, 2, 3, 4, and 5, can have a summed edition number total of 15. A summation can be calculated in a similar manner for each player of the tie. For example, a first, second, and third player can have each of their respective first, second and third lineups' edition numbers summed. These summed numbers can be stored in the database in associated with each player profile of the contest.

At step 508, the method 500 can include selecting one of a first lineup or a second lineup based on the first edition number total and the second edition number total. The edition number totals can be stored in association with the respective player profile and contest. The edition number totals can be accessed by the one or more processors to determine the selection. Selecting the one of the first lineup or the second lineup can include determining, by the one or more processors, that the first edition number total is greater or less than the second edition number total. Determining that the first edition number total is greater or less than the second edition number total can include a comparison of the totals to establish which quantity exceeds the other.

Selection of a first player or a second player based on the edition number totals can indicate a winner and a loser. In some embodiments, selection of the first player with the greater edition number total can indicate the first player is the winner. This can, in some embodiments, indicate that the second player is the loser. The selection can be extended beyond two players. For example, if a first player has the greatest edition number total and is selected the winner, the second, third, and subsequent players of the same contest can be declared losers. In some embodiments, the winning player can receive an award. The winning player can receive an award that is stored in association with the respective player profile. The award can be at least an NFT 475, money, or a ticket to enter another of the one or more contests.

The quantities can be compared via an external computing device, a comparator, or within the system 400. The determination of a selection can be stored in association with the player profile. For example, a first player who has been selected as the winner can have that title stored in association with the respective player profile. In some embodiments, other players can view (via a client device) that the first player has won a respective contest. For example, a second player can view (via an application running on a client device) an indication of the first player profile has received an award from the respective contest.

Figure 7:
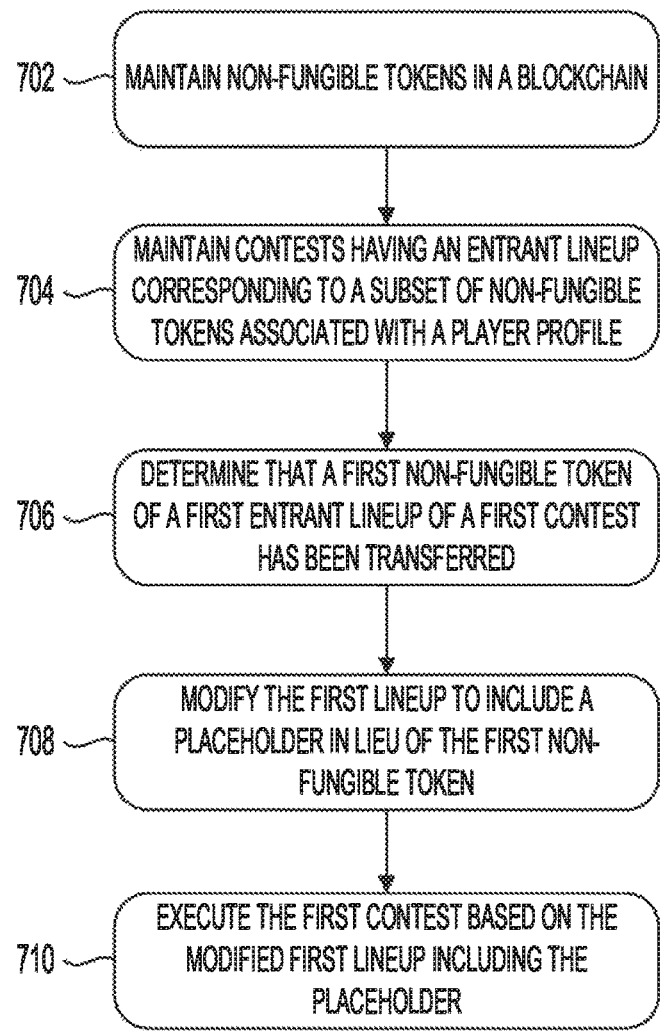
FIG. 7 illustrates an example flow diagram of a method for establishing a placeholder, in accordance with one or more implementations.

Referring now to FIG. 7, depicted is an example flow method 700 for establishing a placeholder. The method 700 can be executed, performed, or otherwise carried out by the data processing system 205 described in connection with FIG. 2, the data processing system 405 described in connection with FIG. 4, the computer system 100 described in connection with FIGS. 1A-1D, or any other internal or external computing devices described herein. In a brief overview, the method 700 can include maintaining non-fungible tokens in a blockchain (STEP 702), maintaining contests having an entrant lineup corresponding to a subset of non-fungible tokens associated with a player profile (STEP 704), determining that a first non-fungible token of a first entrant lineup of a first contest has been transferred (STEP 706), modifying the first lineup to include a placeholder in lieu of the first non-fungible token (STEP 708) and executing the first contest based on the modified first lineup including the placeholder (STEP 710).

Step 702 of method 700 can include maintaining a plurality of non-fungible tokens in a blockchain. Maintaining a plurality of NFTs 475 can include modifying or changing the attributes, transferring the one or more NFTs 475 from a first user profile to a second user profile (including via a wallet, as described herein), or minting one or more NFTs. In some embodiments, maintaining the NFTs 475 in a blockchain can refer to storing or updating information related to each NFT within the blockchain. For example, maintaining an NFT in the blockchain can refer to editing the digital ledger to indicate a second player has taken possession of the NFT from a sale or trade from a first player.

Step 704 of method 700 can include maintaining contests having an entrant lineup corresponding to a subset of non-fungible tokens associated with a player profile. In some embodiments, a player can enter a lineup which includes a subset of NFTs 475 associated with the player into a contest. This is described in more detail herein. One or more players can each enter a contest with a respective lineup. Maintaining the contests can include maintaining the lineup. For example, maintaining the contest can include updating the lineup responsive to a change in attributes of NFTs entered into the lineup by a first player.

In some embodiments, a first player may enter a subset of NFTs 475 into a lineup for entrance into a first contest. Subsequent to that entrance, the first player may flag an NFT a second NFT of the submitted lineup. Step 704 can include determining, by the one or more processors, prior to a start time of the first contest, that a second non-fungible token of the first lineup is associated with a listing flag. A listing flag can be an attribute of an NFT which indicates that it is currently listed in the marketplace for sale or trade. In some embodiments, if a second NFT is entered into a lineup and then subsequently listed for sale, the second NFT can be reconfigured to include a listing flag. In some embodiments, if a second NFT is listed for sale and then subsequently entered into a lineup for a contest, the second NFT can be reconfigured to include a listing flag. An NFT 475 can be configured to include a listing flag if the NFT has been listed for sale but has not yet been sold or transferred.

Step 704 can further include generating prior to a start time of the first contest, a notification for transmission to a client device associated with the first player profile. Any of the systems or computing devices can generate a notification which can be displayed on a client device. Examples of notifications can be seen in reference to FIGS. 6A-6H. In some embodiments, the notification can indicate that the second non-fungible token is associated with the listing flag. For example, if a first player lists a second NFT for sale subsequent to entering the second NFT into a lineup, a notification can display to the first player (via an application running on a client device) that the player is currently for sale. In some embodiments, the notification can further include a warning that the NFT will be replaced with a placeholder if the NFT is transferred from the first player profile prior to the start time of the contest. In some embodiments, a notification can display to the player if a first NFT is flagged after the start of a contest.

In step 706, the method 700 includes determining that a first non-fungible token of a first entrant lineup of a first contest has been transferred. The first non-fungible token can be transferred, for example to a marketplace or to a second player. In some embodiments, determining that the first non-fungible token of the first lineup has been transferred to a second player profile can include accessing a private key associated with the first player profile. A player profile can include a private key. The private key can be unique to the player profile. Recording a transfer on the blockchain can include accessing the private key of the first player. The private key of the first player can be used to transfer the NFT from the first player's profile to the second player's profile and to record the transfer on the ledger (e.g., blockchain). In some embodiments, the private key can be accessed by the system but may not be visible to the first player or to any other player of the one or more players. The private key can be associated with ownership of an NFT 475. For example, the private key can include or be associated with an address of an NFT that a player owns. In some embodiments, accessing the private key associated with a profile can be associated with the ownership of one or more NFTs 475.

In step 708, the method 700 can include modifying the first lineup to include a placeholder in lieu of the first non-fungible token. A placeholder can be any icon, athlete, or alternative NFT that can take the place of an existing NFT. In some embodiments, a placeholder can be used in lieu of a first NFT of the first player if the first NFT of the first player is entered into a lineup and then is subsequently transferred prior to the commencement of the contest in which the first NFT was entered. For example, if a player enters a Josh Allen NFT into a lineup for entrance into a contest, the player can still maintain the option of the selling or trading the first NFT, regardless of contest entrance status. If the first player should choose to list the first Josh Allen NFT for sale, the player may be alerted (e.g., step 704) via a notification that the player is listed for sale. Furthermore, in some embodiments if the first Josh Allen NFT is sold while entered into the lineup but prior to the commencement of the contest, the player may still participate in the contest. However, the submitted lineup of the player can be modified by the system to no longer include the Josh Allen NFT, but rather a placeholder. In this manner, a player can still participate in a contest after selling an NFT 475 entered into a lineup. A player can have one or more placeholders in a modified lineup.

Step 710 of method 700 can include executing the first contest based on the modified first lineup including the placeholder. Executing the first contest can refer to allowing the first player to participate in the contest, against one or more players entered in the contest, with one or more placeholders standing in for one or more NFTs 475. Contest execution can be responsive to the start time of a live event. Contest execution can include a start time of the contest, which can be corresponding to a live event start time, or at a separate time. In some embodiments, responsive to the execution of a first contest, a lineup of a first player entered into the first contest can no longer be modified.

Execution of the contest can further include maintaining a score for each lineup associated with each player of the one or more players participating in the contest. The score can be maintained as described herein. In some embodiments, each athlete of the lineup can score points for the lineup based on the team corresponding to the athlete. For example, a defensive player of the Buffalo Bills can score points based at least on the overall sore of the current live event the Buffalo Bills are participating in as a whole. Executing the first contest based on the modified first lineup can include accumulating at least one point for the first lineup based on the first lineup not including the first non-fungible token. For example, if a first player has in their lineup a placeholder, the placeholder can score at least one point. A point can refer to a quantitative score as determined by the rules of the contest.

Step 710 can further include restricting a second non-fungible token of the first lineup from being associated with a listing flag responsive to executing the first contest. In some embodiments, if a first player lists a second NFT in a lineup and the contest associated with that lineup begins, the second NFT can be restricted from having a listing flag. For example, if an NFT is participating in a contest which has begun, that NFT cannot be listed for sale or trade in the marketplace. In some embodiments, upon completion of the contest, the restriction can be lifted and the NFT can be available for listing for sale or trade again. Step 710 can further include providing instructions to display a notification at a client device associated with the first player profile indicating that the second non-fungible token is restricted. Responsive to the commencement of a contest in which a second NFT is participating, a notification can be displayed via an application at a client device. The notification can alert the first player that the second NFT is restricted from sale, or from having a listing flag associated with it.

Figure 6A:
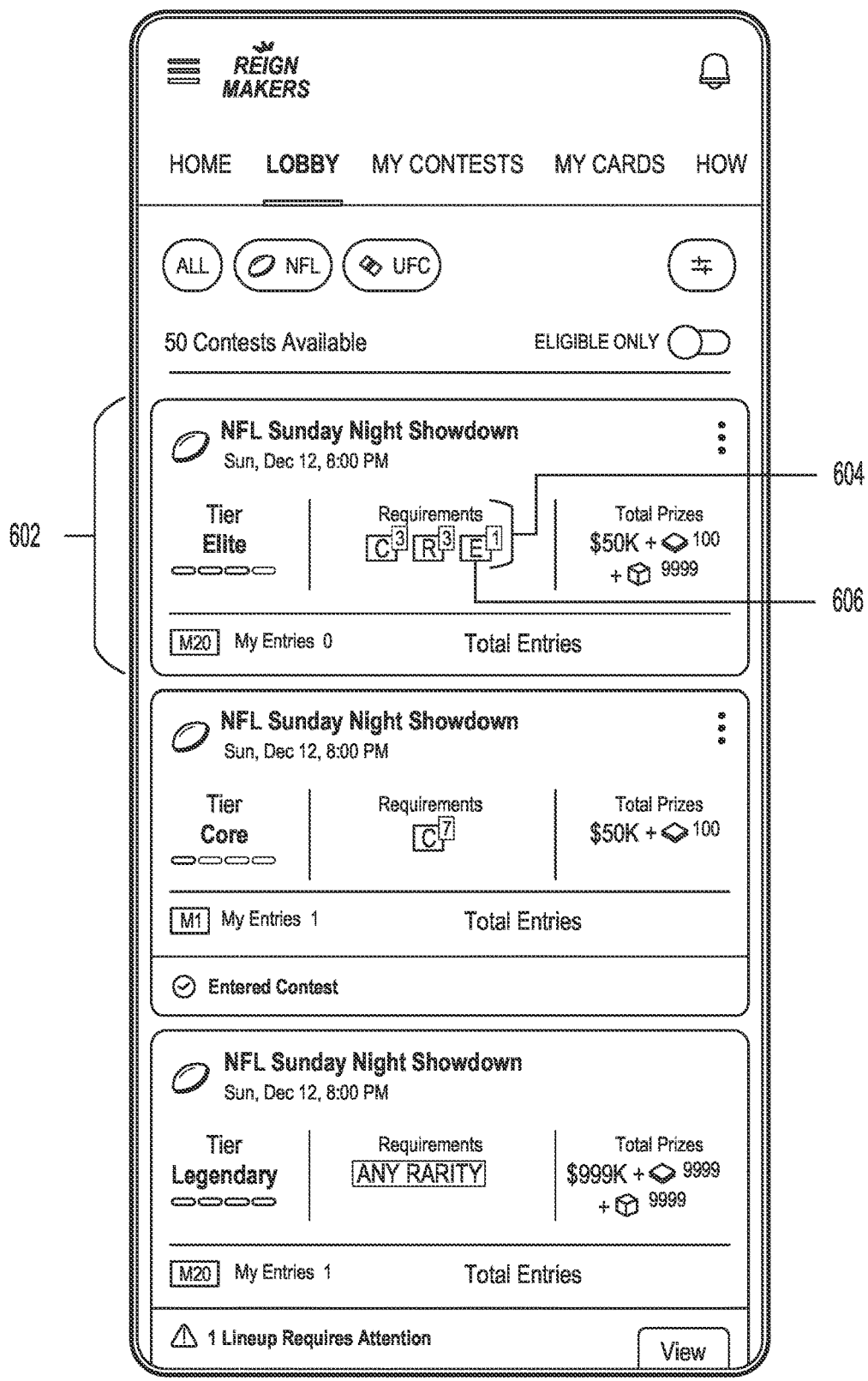

Referring now to FIGS. 6A-6H, illustrated are example user interfaces 600A-600H that can be displayed by an application executing on a client device (e.g., the client device 220 or the client device 420, etc.). The application can be associated with, and communicate with, the data processing system 205 or 405 via one or more networks (e.g., the network 210 or the network 410). The application can include actionable objects. Some example actionable objects that enable the player to make selections can include drop-down menus, interactive buttons, hyperlinks, search bars, or other types of graphical user interface elements. FIGS. 600A-600F can be described in connection with Section B above. Referring now to FIG. 6A, depicted is an example user interface 600A of the application which includes a plurality of available contests (e.g., like contests 290 or 490) associated with a player profile. Below a set of interactive user interface elements (e.g., "LOBBY" or "HOME") is a list of available contests (e.g., which may match certain player-specified filtering criteria). The available contests can be generated using the techniques described herein and can be selected via interactions with the application presenting the user interface 600A. As shown, each contest (indicated in the user interface 600A as a respective contest content item 602) can include a content item for requirements 604 and a content item for selection rules 606. Requirements 604 can include slots 285 as described herein. Selection rules 606 can be like rules 280 described herein as well. Contest content item 602 can be selected by the user and can include at least a date of the contest, requirements 604 of the contest, or an award of the contest. Player specified filtering criteria can be input to the interface by way of a search bar, selection check boxes, voice command, or other filtering mechanism. Filtering a subset of contests 290 can include filtering by criteria such as a player's eligibility for a contest (e.g., if the player has an entrance ticket to a contest or a minimum number of NFTs 275), player-specified tags (e.g., a subset of contests corresponding to the NFL or the National Hockey League (NHL)), or by entrance time of the contest.

Figure 6B:
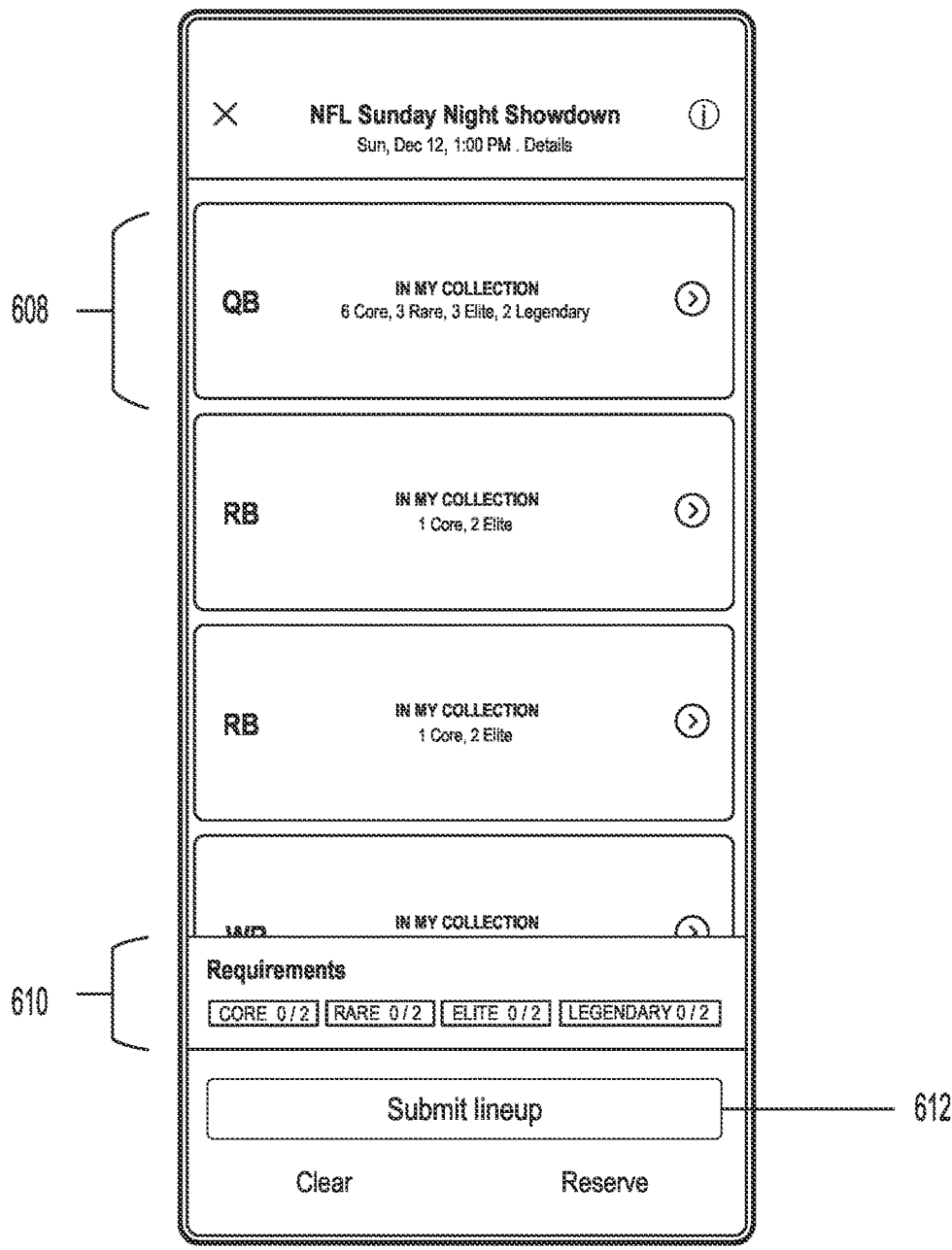

If a contest content item 602 is selected by a player, it can display an interface like shown in FIG. 6B. FIG. 6B includes an interface 600B displaying an example means of choosing NFTs 275 or 475 for a lineup for entrance into the selected contest. The example interface can include an indicator of which contest, either by date or by name. Furthermore, the example interface in FIG. 6B can include example categories of NFTs to choose from 608. Content Item 608 displays a "QB" category of NFTs, containing "6 Core, 3 Rare, 3 Elite, 2 Legendary." Interface 600 can further include a content item displaying "Requirements" 610. Content item 610 can show the necessary rarity attributes (as described above herein) of the chosen contest. Content item 612 can include an actionable object to "Submit lineup." Submit lineup can mean to enter the chosen lineup into the selected contest.

Figure 6C:
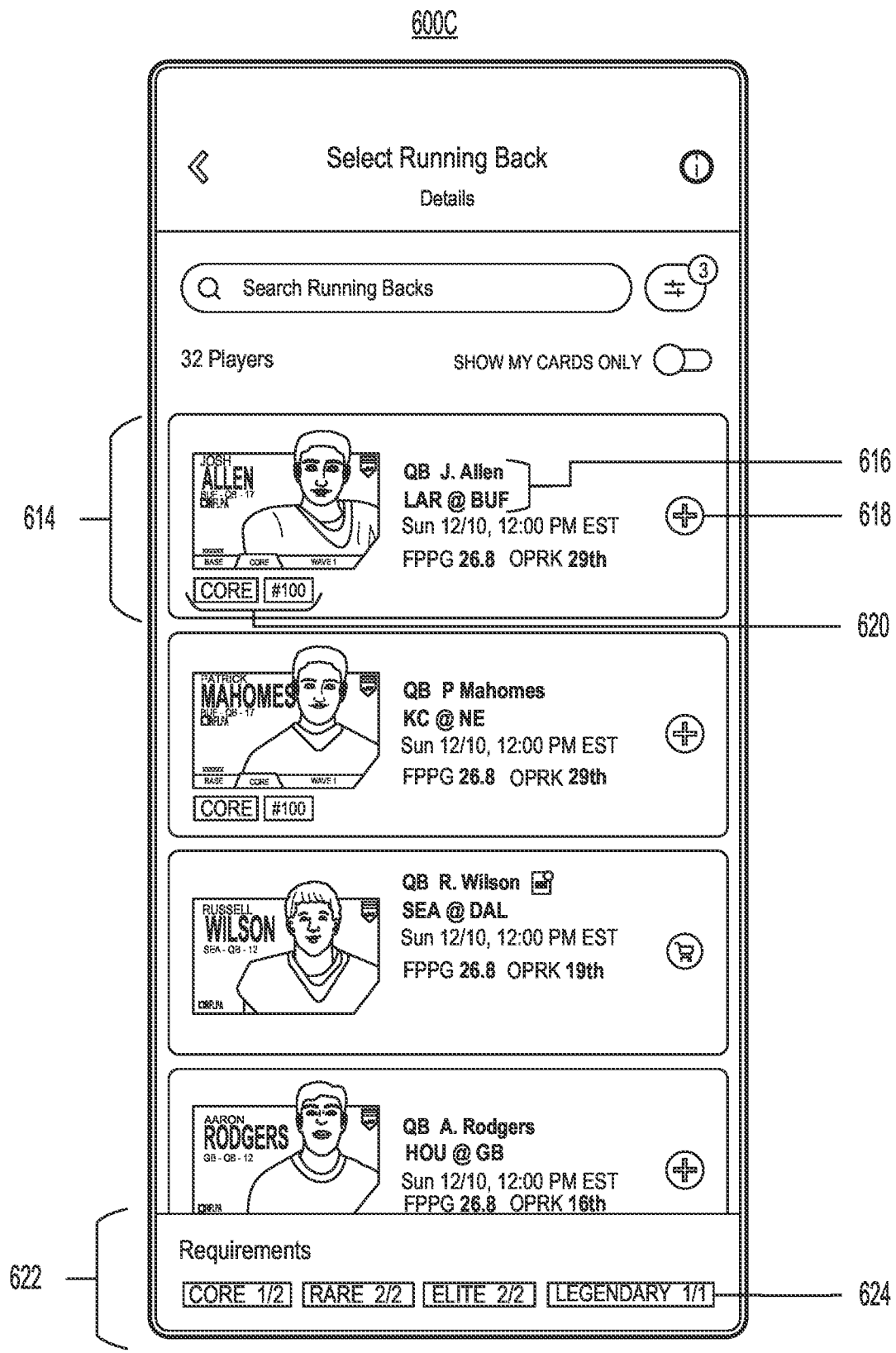

Selecting content item 608 from interface 600B can result in an interface like that in FIG. 6C. FIG. 6C depicts an example interface 600C which displays a listing of NFTs 275 or 475 associated with a player profile and listed under the category "QB." Content item 614 is an example of an NFT associated with a player profile 270 or 470. Content item 614 includes content items 616, 618, and 620. Content item 616 can be a personal identifier of the NFT, such as "QC J. Allen LAR @ BUF." A personal identifier can include any information about the NFT such as an associated athlete's name or live event which the athlete may be participating in. Content item 618 can be a content item to add the particular NFT to the player's lineup. Content item 620 can display attributes of the NFT, such as rarity or edition number. Content item 622 depicts example requirements for entrance into the contest, as described herein. Content item 624 illustrates a specific rarity requirement of the lineup has been satisfied (e.g., "LEGENDARY 1/1"). In some embodiments, the player can select to show only the NFTs associated with their player profile. For example, showing only his or her cards can refer to displaying only NFTs associated with or owned by a player and not showing NFTs available in the marketplace.

Figure 6D:
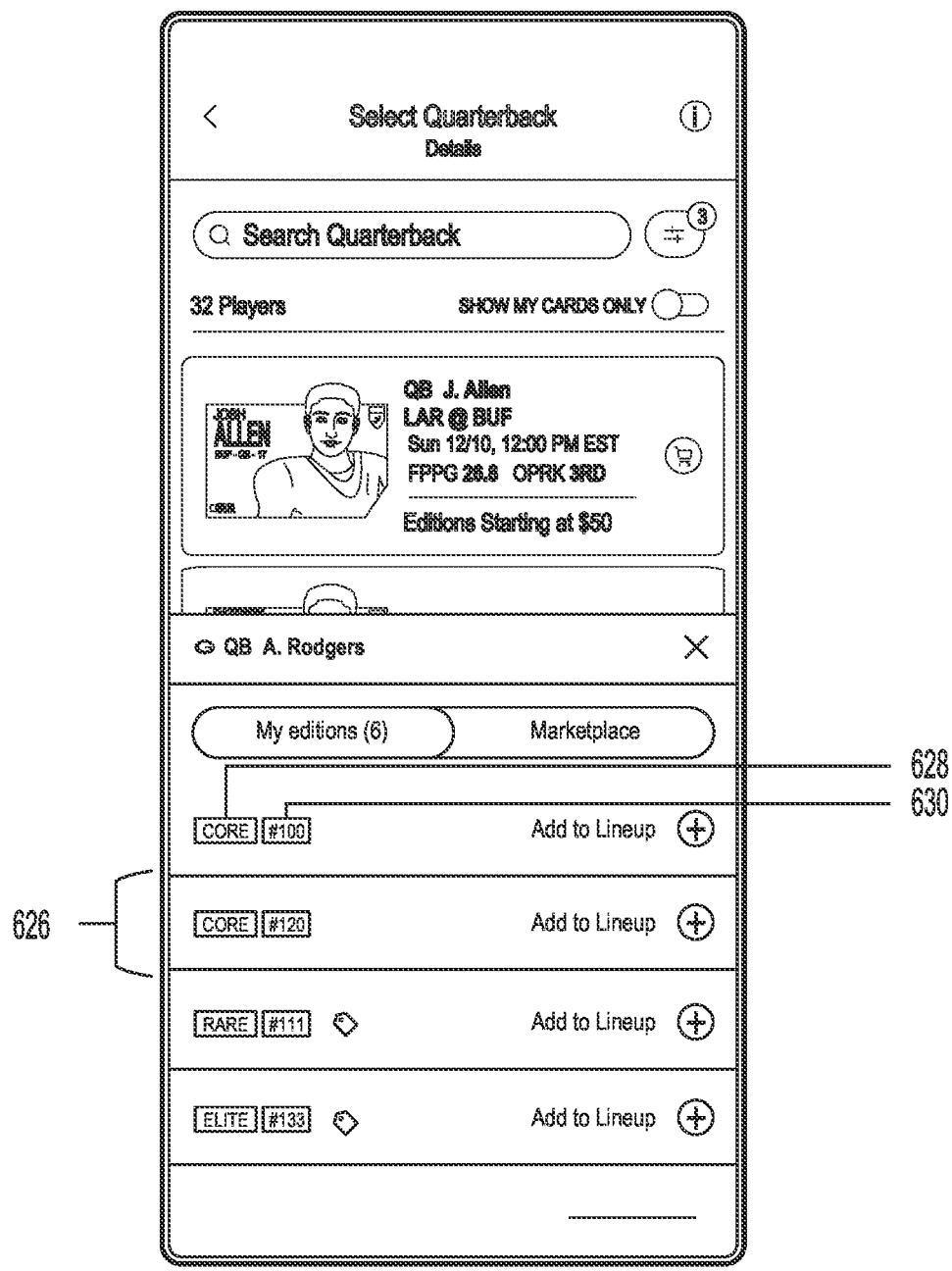

Responsive to selecting a content item like content item 614 in FIG. 6C, interface 600D in FIG. 6D can display. Example interface 600D shows content item 636. Content item 626 illustrates a listing of different NFTs of "QB A. Rodgers" type which a player has associated with their profile. Within content item 626 are contents items 628 and 630. Content items 628 and 630 can help to differentiate a first NFT from a second NFT of a same name. Content item 628 can be a rarity attribute of an NFT. Content item 630 can indicate the edition number of an NFT, which can be utilized in the tie-breaker techniques described herein.

Figure 6E:
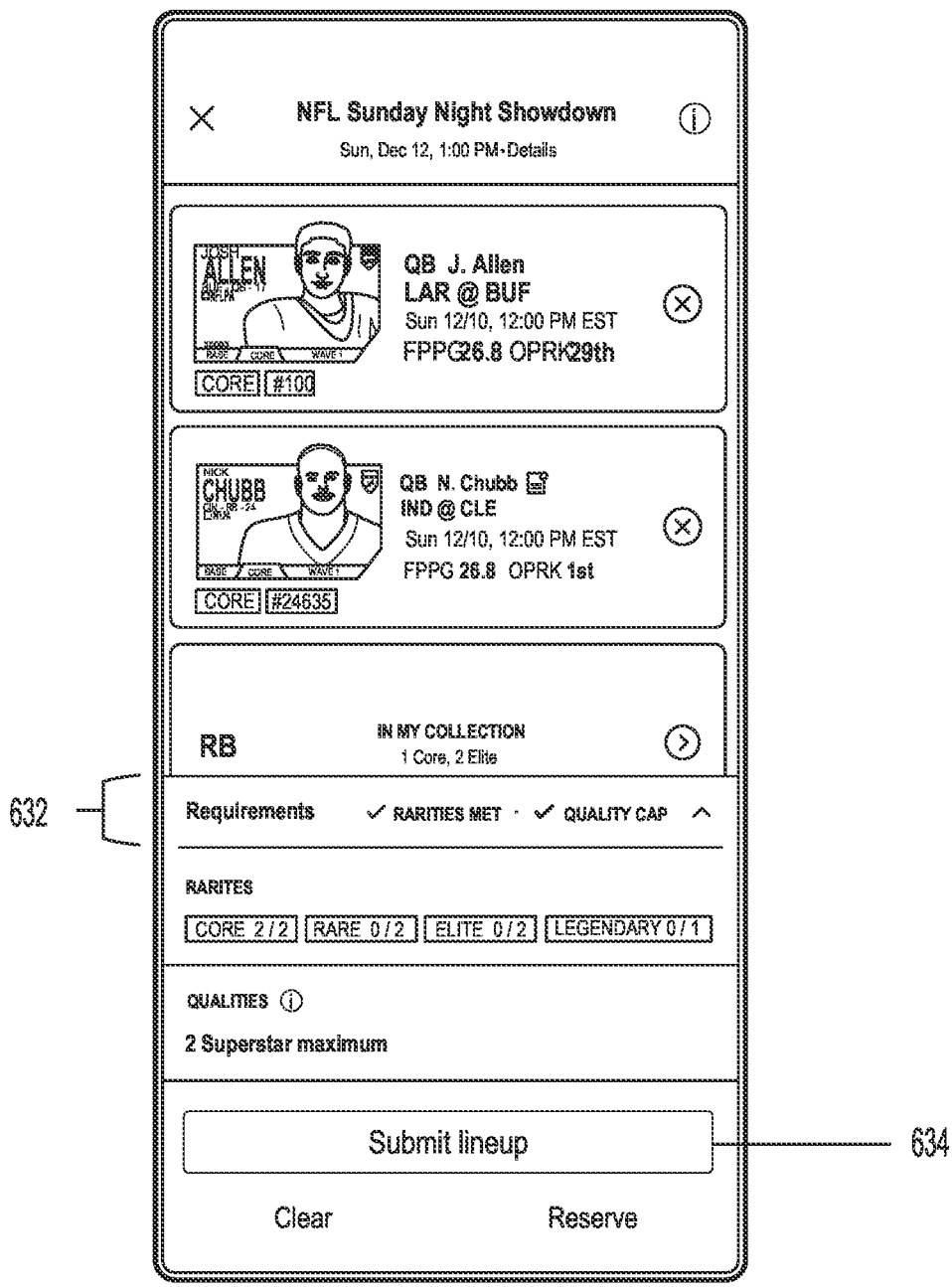

FIG. 6E shows an alternative example interface for creating a lineup. This interface can be an alternative to interfaces 600A, 600B, or 600C and can display responsive to the requirements of a lineup being met. Content item 632 indicates that the requirements of the lineup for the contest. Example requirements to be met include rarities and qualities, such as "CORE 2/2." Displayed in content item 632 is a warning of a quality cap being met. The system (e.g., system 200 or 400) may limit attributes of NFTs of a lineup to a certain quantity of a first attribute. Content item 634 displays an actionable item for submitting the lineup.

Figure 6F:
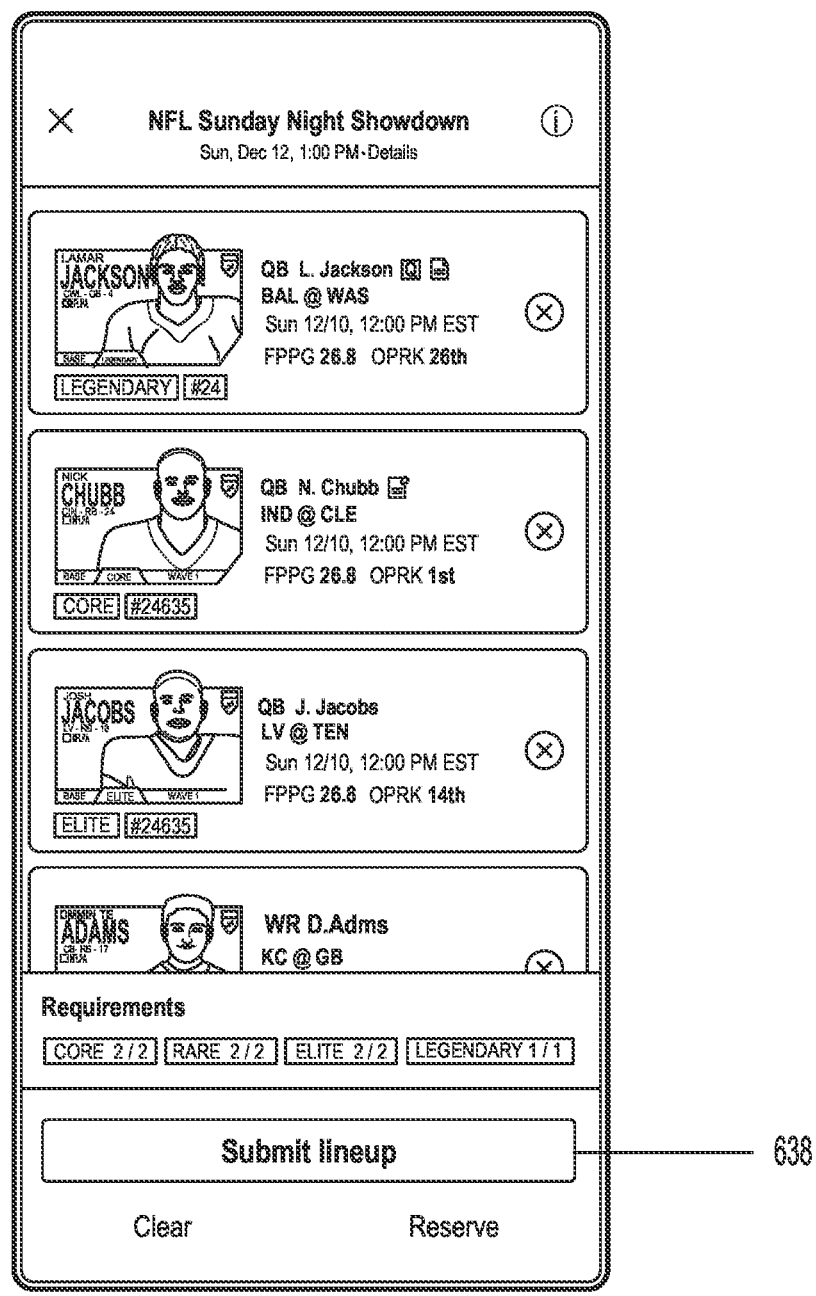

Depicted in FIG. 6F is an example interface 600F which displays satisfaction of all requirements. The requirements content item 636 can be satisfied in this example. For example, content item 636 shows "CORE 2/2", "RARE 2/2", "ELITE 2/2" and "LEGENDARY 1/1," thereby satisfying the shown requirements. Responsive to satisfying the requirements, a player can actuate a submit lineup content item 638. Interaction with this content item 638 can cause the client device to submit the proposed lineup to the data processing system for entrance into the selected contest.

Figure 6G:
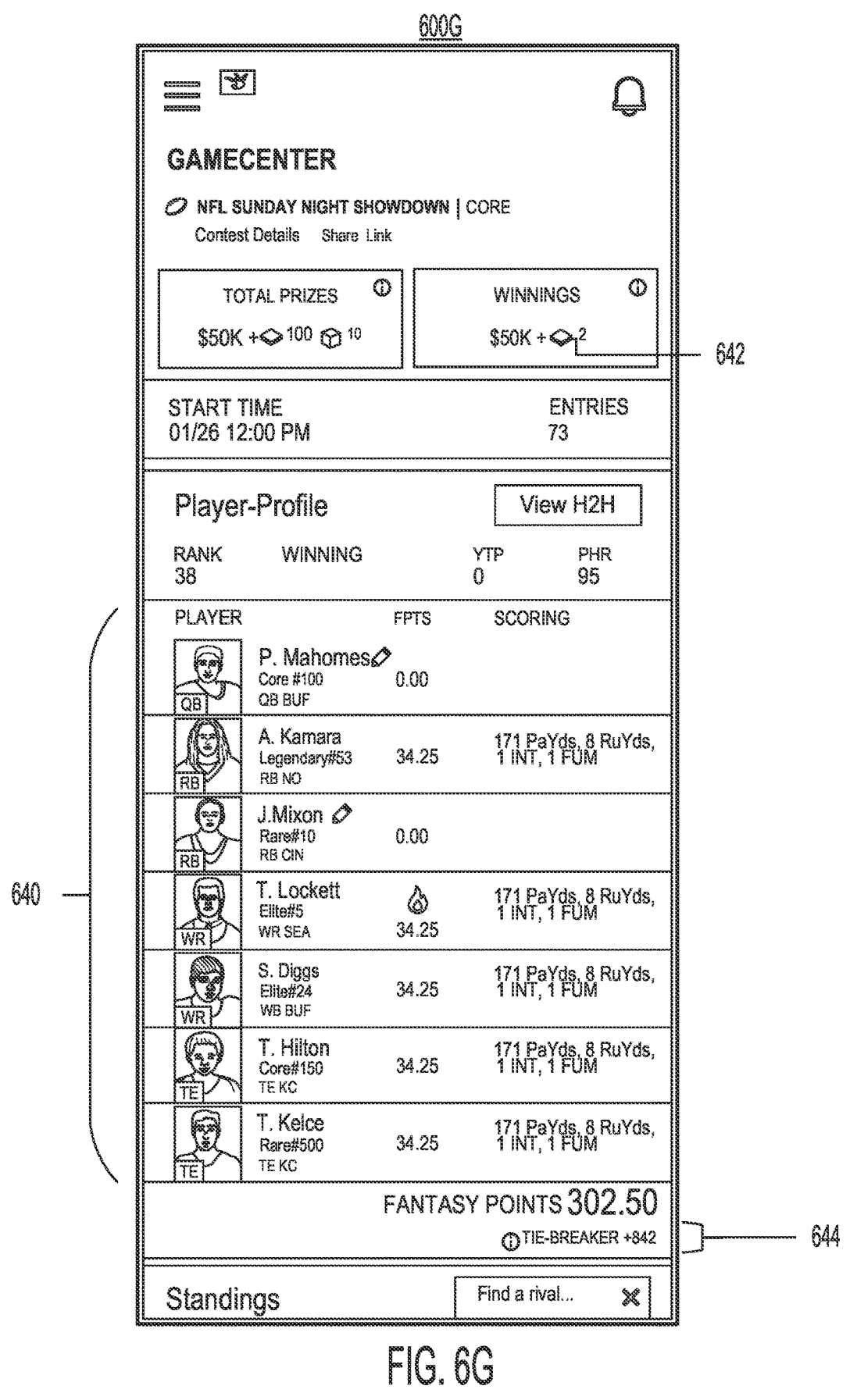
Figure 6H:
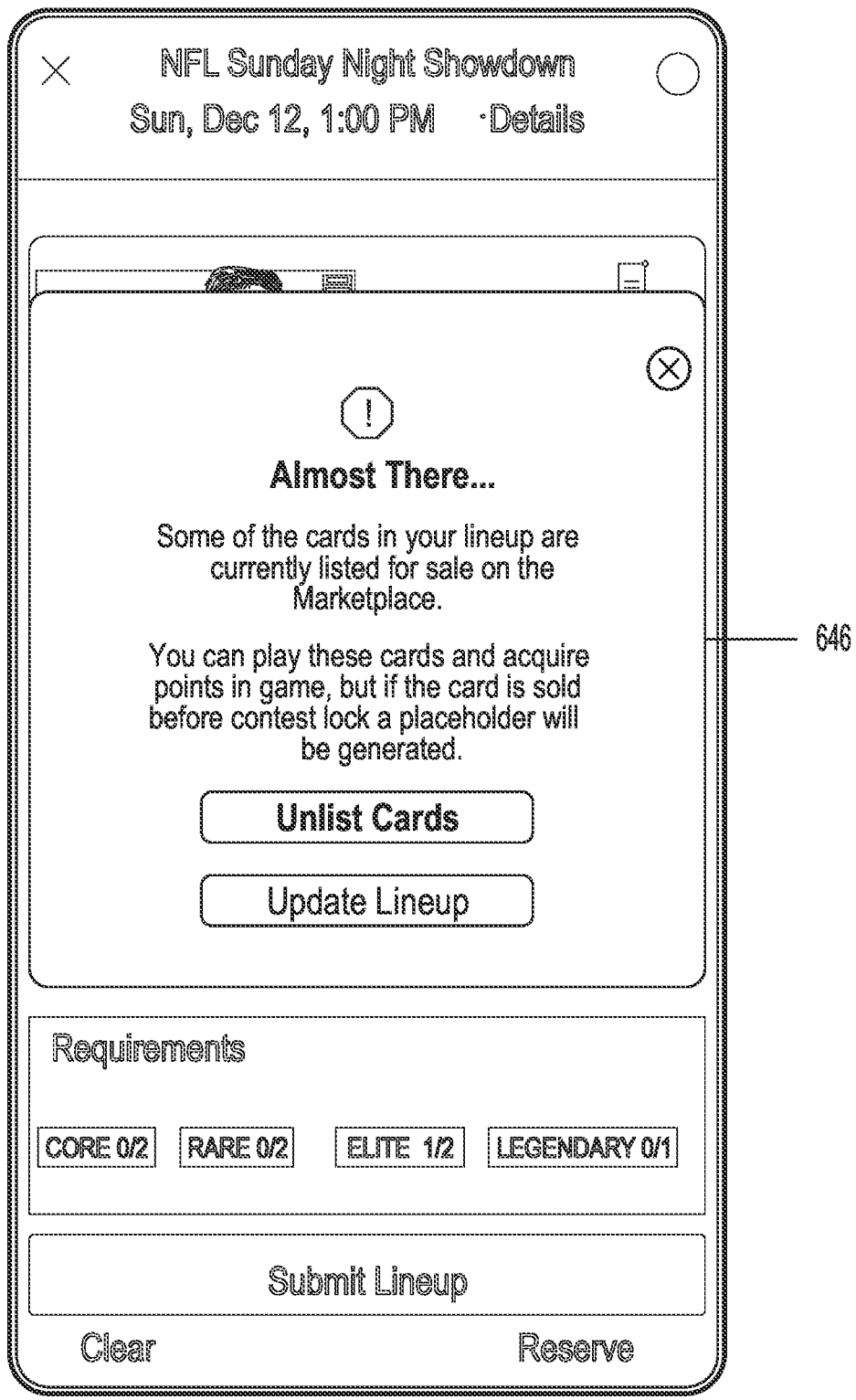

Referring now to FIGS. 6G and 6H, which can be described in reference to Section C above, FIG. 6G depicts an example interface 600G of a contest resulting in a tie. Example interface 600G can include content items 640, 642, and 644. Content item 640 illustrates a first lineup of NFTs submitted by a first player into a first contest. Content item 640 includes a one or more NFTs, each associated with a respective athlete of the contest (e.g., P. Mahomes, A. Kamara, J. Mixon, etc.), each NFT having a one or more attributes (e.g., P. Mahomes has the attributes of "QB", "Core", and "#100"). Content item 640 further includes an example scoring system of the contest for each player. For example, A. Kamara, at the conclusion of the contest, has scored "171 PaYds, 8 RuYds, 1INT, 1 FUM. In some embodiments, each NFT can be scored on its individual contributions to the contest. In some embodiments, each NFT can be scored on the contribution of its respective team to the contest. Content item 642 demonstrates a subset of an award. The subset in content item 642 depicts an icon which can represent an award NFT, as described herein. Content item 644 illustrates an example of a tie breaker indication. In some embodiments, content item 644 can be the summation of edition numbers, as described herein FIG. 6H illustrates an example user interface 600H for displaying a notification indicating an NFT is marked with a listing flag. Interface 600H can include content item 646. Content item 646 can depict a notification to warn a player that the NFTs the player has entered into the lineup have been listed for sale on the marketplace, and may be replaced with placeholders for the contest if they are sold prior to the start time of the contest. For example, if a first player lists a first NFT in the marketplace and subsequently plays the first NFT in a first lineup for a contest, the data processing system can transmit instructions to display the content item 646 at an application executing on the client device of the first player.

The data processing system 205 or 405 can credit an account specified in the player profile 270 or 470 based on award and player winner in the contest. For example, the data processing system 205 or 405 may monitor one or more outcomes of the contests 290 or 490 in based upon lineups entered via one or more client devices 220. In some implementations, the actual outcomes of the contests 290 or 490 can be monitored by an external source (e.g., a third party, an external computing system, etc.) that communicates the actual outcomes of the contests 290 or 490 to the data processing system 205 or 405.

Although not shown in FIGS. 6A-6H, it should be understood that similar user interfaces may be utilized to assemble lineups for contests. The live events, contests (e.g., contests 290 or 490), and NFTs (e.g., NFTs 275 or 475) can be selected by a player using techniques similar to those described herein, and may be utilized to assemble lineups for contests 290 and 490 that may be concurrent or subsequent to one another. Upon receiving a request from a player (e.g., a selection of NFT, contest, or lineup), the data processing system 205 or 405 can update the player profile 270 or 470 used to access the functionality of the data processing system 205 or 405 with a record of the lineup and can monitor the live events corresponding to the contest as they occur.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus," "data processing system," "client device," "computing platform," "computing device," or "device" encompass all kinds of apparatuses, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system such as the data processing system 205 can include clients and servers. For example, the data processing system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the data processing system 205 or 405 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for modeling live events, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A method, comprising:
storing, by one or more processors coupled to non-transitory memory, for each token of a plurality of non-fungible tokens of a blockchain network, in a storage system separate from the blockchain network, a respective metadata value;
receiving, by the one or more processors, from a client device, selections of a subset of the plurality of non-fungible tokens, each non-fungible token of the subset selected for a respective slot of a contest;
determining, by the one or more processors and by accessing the storage system separate from the blockchain network, that the respective metadata of each non-fungible token of the subset satisfies the respective slot of the contest; and
responsive to determining that the respective metadata of each non-fungible token satisfies the respective slot of the contest, modifying, by the one or more processors, in the storage system separate from the blockchain network, a restriction condition for each non-fungible token of the subset to restrict each non-fungible token of the subset from entry into a second contest.

2. The method of claim 1, further comprising maintaining, by the one or more processors, the plurality of non-fungible tokens via the blockchain network.

3. The method of claim 1, wherein the respective metadata of each non-fungible token of the subset comprises at least one of a rarity value and an edition number.

4. The method of claim 3, wherein the rarity value of each non-fungible token of the plurality of non-fungible tokens is further maintained via the blockchain network.

5. The method of claim 1, further comprising determining, by the one or more processors, that the respective metadata of a first non-fungible token of the subset satisfies a selection rule of the respective slot of the contest.

6. The method of claim 1, further comprising transmitting, by the one or more processors, a content item to the client device indicating each non-fungible token of the subset is included in a fantasy sports lineup.

7. The method of claim 1, further comprising modifying, by the one or more processors, the respective metadata of at least one non-fungible token of the subset based on an outcome of the contest.

8. The method of claim 1, further comprising:
receiving, by the one or more processors, a request for available contests; and
providing, by the one or more processors to the client device, instructions to present a first graphical user interface that includes one or more indicators of a plurality of contests including the contest.

9. The method of claim 8, further comprising providing, by the one or more processors, responsive to an interaction with the first graphical user interface, a second graphical user interface comprising a set of content items, each content item of the set of content items corresponding to a respective non-fungible token of the plurality of non-fungible tokens.

10. The method of claim 1, further comprising identifying, by the one or more processors, the plurality of non-fungible tokens based on a player profile associated with the client device.

11. A system, comprising:
one or more processors coupled to non-transitory memory, the one or more processors configured to:
store, for each token of a plurality of non-fungible tokens of a blockchain network, in a storage system separate from the blockchain network, a respective metadata value;
receive, from a client device, selections of a subset of the plurality of non-fungible tokens, each non-fungible token of the subset selected for a respective slot of a contest;
determine, by accessing the storage system separate from the blockchain network, that the respective metadata of each non-fungible token of the subset satisfies the respective slot of the contest; and
responsive to determining that the respective metadata of each non-fungible token satisfies the respective slot of the contest, modify, in the storage system separate from the blockchain network, a restriction condition for each non-fungible token of the subset to restrict each non-fungible token of the subset from entry into a second contest.

12. The system of claim 11, wherein the one or more processors are further configured to maintain the plurality of non-fungible tokens via the blockchain network.

13. The system of claim 11, wherein the respective metadata of each non-fungible token of the subset comprises at least one of a rarity value and an edition number.

14. The system of claim 13, wherein the rarity value of each non-fungible token of the plurality of non-fungible tokens is further maintained via the blockchain network.

15. The system of claim 11, wherein the one or more processors are further configured to determine that the respective metadata of a first non-fungible token of the subset satisfies a selection rule of the respective slot of the contest.

16. The system of claim 11, wherein the one or more processors are further configured to transmit a content item to the client device indicating each non-fungible token of the subset is included in a fantasy sports lineup.

17. The system of claim 11, wherein the one or more processors are further configured to modify the respective metadata of at least one non-fungible token of the subset based on an outcome of the contest.

18. The system of claim 11, wherein the one or more processors are further configured to:
receive a request for available contests; and
provide, to the client device, instructions to present a first graphical user interface that includes one or more indicators of a plurality of contests including the contest.

19. The system of claim 18, wherein the one or more processors are further configured to provide, responsive to an interaction with the first graphical user interface, a second graphical user interface comprising a set of content items, each content item of the set of content items corresponding to a respective non-fungible token of the plurality of non-fungible tokens.

20. The system of claim 11, wherein the one or more processors are further configured to identify the plurality of non-fungible tokens based on a player profile associated with the client device.

* * * * *